United States Patent
Aotsuka

(10) Patent No.: US 7,148,920 B2
(45) Date of Patent: Dec. 12, 2006

(54) SOLID STATE IMAGE PICKUP DEVICE CAPABLE OF DISTINGUISHING BETWEEN LIGHT SOURCES AND IMAGE PICKUP APPARATUS USING SUCH SOLID STATE IMAGE PICKUP DEVICE

(75) Inventor: Yasuo Aotsuka, Miyagi (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 10/364,511

(22) Filed: Feb. 12, 2003

(65) Prior Publication Data

US 2003/0169354 A1    Sep. 11, 2003

(30) Foreign Application Priority Data

Mar. 5, 2002    (JP)    ............................. 2002-059063

(51) Int. Cl.
H04N 9/73    (2006.01)
H04N 9/083    (2006.01)
G01J 3/50    (2006.01)
G03F 3/08    (2006.01)

(52) U.S. Cl. .................. 348/223.1; 348/280; 250/226; 358/518

(58) Field of Classification Search ............. 348/223.1, 348/224.1, 225.1, 655, 226.1, 272, 273, 230.1, 348/289, 371, 208.6, 280, 281; 250/226; 257/232; 358/515, 518; 382/162
See application file for complete search history.

(56) References Cited

U.S. PATENT DOCUMENTS

| | | | | |
|---|---|---|---|---|
| 5,063,439 A | * | 11/1991 | Tabei | 348/272 |
| 5,087,936 A | * | 2/1992 | Ogata et al. | 396/168 |
| 5,253,046 A | * | 10/1993 | Shiraishi | 348/237 |
| 5,555,464 A | * | 9/1996 | Hatlestad | 348/266 |
| 5,805,217 A | * | 9/1998 | Lu et al. | 348/273 |
| 5,889,554 A | * | 3/1999 | Mutze | 348/273 |
| 6,008,511 A | * | 12/1999 | Tokumitsu et al. | 257/232 |
| 6,459,449 B1 | * | 10/2002 | Juen | 348/223.1 |
| 6,473,123 B1 | * | 10/2002 | Anderson | 348/230.1 |
| 6,515,275 B1 | * | 2/2003 | Hunter et al. | 250/226 |
| 6,573,935 B1 | * | 6/2003 | Yamada | 348/272 |
| 6,657,663 B1 | * | 12/2003 | Morris | 348/273 |
| 6,803,955 B1 | * | 10/2004 | Yosida | 348/273 |
| 7,030,916 B1 | * | 4/2006 | Aotsuka | 348/272 |
| 2002/0158978 A1 | * | 10/2002 | Gann et al. | 348/272 |

FOREIGN PATENT DOCUMENTS

| | | |
|---|---|---|
| JP | 03-174890 | 7/1991 |
| JP | 05-328362 | 12/1993 |
| JP | 2000-333185 | 11/2000 |
| JP | 2001-016598 | 1/2001 |
| JP | 2001-224037 | 8/2001 |
| JP | 2002-071458 | 3/2002 |

* cited by examiner

*Primary Examiner*—Yogesh K. Aggarwal
*Assistant Examiner*—John M. Villecco
(74) *Attorney, Agent, or Firm*—Arent Fox PLLC

(57) ABSTRACT

There are photographing scenes which are difficult, for a conventional image pickup apparatus having a solid state image pickup device with primary color filters, to correctly judge whether an illumination light source is the sun or a fluorescent lamp. The solid image pickup device of an image pickup apparatus uses two types of red or green pixels having different spectral sensitivities. The type of a light source can be judged by using signals from the two types of the pixels.

3 Claims, 15 Drawing Sheets

US 7,148,920 B2

SOLID STATE IMAGE PICKUP DEVICE CAPABLE OF DISTINGUISHING BETWEEN LIGHT SOURCES AND IMAGE PICKUP APPARATUS USING SUCH SOLID STATE IMAGE PICKUP DEVICE

CROSS REFERENCE TO RELATED APPLICATIONS

This application is based on Japanese Patent Application No. 2002-059063, filed on Mar. 5, 2002. The subject matter of this application relates to that of US patent application, filed on Sep. 17, 2002 by the same inventor. The entire contents of these applications are incorporated herein by reference.

BACKGROUND OF THE INVENTION

A) Field of the Invention

The present invention relates to a solid state image pickup device and an image pickup apparatus having a white balancing function.

B) Description of the Related Art

Most of recent image pickup apparatuses such as video cameras, digital still cameras, and those digital cameras mounted on portable phones and personal computers utilize CCD (charge coupled device) type solid state image pickup devices or MOS (metal-oxide-semiconductor) type solid state image pickup devices as area image sensors.

In both of CCD and MOS type solid state image pickup devices, upon incidence of light, output signals (pixel signals) are generated from electric charges accumulated in a number of photoelectric conversion elements disposed in the surface layer of a semiconductor substrate in a matrix shape in rows and columns. In most of solid state image pickup devices, an output signal (pixel signal) generating unit is fabricated on the same semiconductor substrate on which photoelectric conversion elements are formed.

The output signal generating unit is classified into two types. In one type, charges accumulated in charge transfer units made of CCDs are transferred to a charge detector circuit which generates output signals. CCD is formed by forming a charge transfer channel in the surface layer of a semiconductor substrate and disposing a number of electrodes on an electrically insulating film.

In the other type, electric charges accumulated in a photoelectric conversion element are transferred to an output signal line via a MOS transistor circuit to generate a current or voltage output signal.

A single plate solid state image pickup device for taking a color image has generally a color filter array disposed above photoelectric conversion elements. The color filter array includes color filters of three or more colors. One color filter is provided for each photoelectric conversion element. One photoelectric conversion element and one color filer disposed above the conversion element constitute one pixel.

In a color image pickup apparatus, pixel signals output from the solid state image pickup device are subjected to color separation to generate red, green and blue signals representative of red, green and blue color information of an object to be photographed. These signals are subjected to gamma correction to generate a luminance signal Y and red and blue color difference signals Cr and Cb.

The spectral distribution of light reflected from the surface of an object or the spectral distribution of light transmitted through an object changes greatly with the spectrum distribution of light applied to the object. A person recognizes the object from the reflected or transmitted light.

The color of an object sensed by a person is not determined only by the spectrum distribution of reflected or transmitted light. Each person unconsciously corrects the color based upon ambient light. For this reason, even if the spectral distribution of light applied to an object changes greatly, the color of the object sensed by the person does not change so much.

A color image pickup apparatus is generally equipped with an auto white balance function in order to form an image having a color as near as possible to a color sensed by the person. The auto white balance function reproduces the original color, white as white and gray as gray, independently from the type of illuminating light (including sun light) applied to an object. The levels of blue, green and red signals generated through color separation are controlled in accordance with the type of illuminating light to make red, green and blue signals have the same values when white or gray is photographed.

It is important to distinguish between the types of illuminating light of an object in order to properly operate the auto white balance function.

For example, in an image pickup apparatus having a solid image pickup device with primary color filters, a ratio R/G between red and green signals and a ratio B/G between blue and green signals are calculated and the type of illuminating light is distinguished in accordance with the two-dimensional distribution of R/G and B/G ratios. The R/G and B/G ratios are calculated for the whole frame of a photographed scene or for each of divided areas of the whole frame.

This distinguishment assumes that even if the scene contains a variety of objects, the average of these colors is gray.

For example, even if the white balance is adjusted correctly, the color of a reproduced image of a person illuminated with a standard white fluorescent lamp (a preheating type straight tube white fluorescent lamp for general illumination) becomes distorted. In order to reduce such distortion, it is necessary to perform adjustment other than the adjustment of white balance.

It is therefore desired to precisely judge whether illumination light applied to an object is from a standard white fluorescent lamp.

With conventional distinguishment, however, it is often difficult to correctly distinguish the illumination light of a scene between sunlight and fluorescent light. For example, it is difficult to distinguish between leaf green under dim sunlight and gray under light of a general white fluorescent lamp or three-wavelength type fluorescent lamp. Therefore it is also difficult to judge a light source of a scene of these.

SUMMARY OF THE INVENTION

An object of this invention is to provide a solid state image pickup device capable of distinguishing illumination light (light source) of an object at a high precision.

It is another object of the invention to provide an image pickup apparatus capable of distinguishing illumination light (light source) of an object at a high precision.

According to one aspect of the present invention, there is provided a solid state image pickup device comprising: a semiconductor substrate; a number of pixels disposed on one surface of the semiconductor substrate along rows and columns in a matrix shape, each pixel including a photoelectric conversion element for accumulating electric charges and a color filter disposed above the photoelectric conversion element for transmitting at least one of red, green and blue light fluxes of incidence light, and a pixel of a same color including two types of pixels having different spectral sensitivities; and an output signal generator for generating an output signal in accordance with charges accumulated in the number of pixels.

According to another aspect of the present invention, there is provided an image pickup apparatus comprising: at least one solid image pickup device capable of converting an optical image of an object into an electric signal and outputting the electric signal, at least one solid image pickup device having a number of pixels including two types of same color pixels having different spectral sensitivities; an image pickup optical system for focusing an object image on at least one solid state image pickup device; a digital signal generator for converting an output signal from at least one solid state image pickup device into a digital signal and outputting the digital signal; a video signal generator for generating red, green and blue signals from the digital signal output from the digital signal generator and generating a pixel signal for image reproduction by using the red, green and blue signals; and an auto white balance circuit for receiving the red, green and blue signals, detecting a color temperature of a light source, judging a type of the light source from a difference between intensities of light incident upon ones and others of the two types of the same color pixels, and adjusting levels of the red, green and blue signals in the video signal generator in accordance with a detection result of the color temperature and a judgement result of the type of the light source.

The light source can be distinguished by using a difference between the intensities of light transmitted through two types of pixels.

For example, a standard fluorescent lamp such as a standard white fluorescent lamp, a daylight fluorescent lamp and a white fluorescent lamp has a radiation peak near at 580 nm. A three-wavelength fluorescent lamp has radiation peaks both on the longer and shorter wavelength sides than near at 580 nm. The sun and a tungsten incandescent lamp have no extreme peak and valley in the wavelength range from 555 to 605 nm.

A solid state image pickup device using two types of pixels of red or green having different spectral sensitivities in the wavelength range from 555 to 605 nm can distinguish between object illumination light sources such as a standard fluorescent lamp, a three-wavelength fluorescent lamp, the sun, and a tungsten incandescent lamp. It becomes easy to improve the color reproductivity.

DESCRIPTION OF THE PREFERRED EMBODIMENTS

Figure 1A:
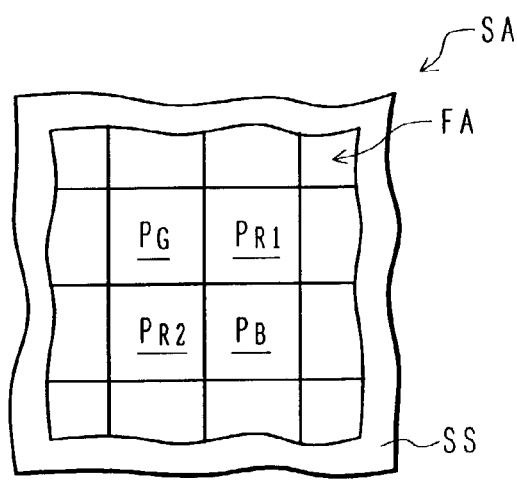
FIG. 1A is a plan view of a semiconductor device having first and second red pixels and green and blue pixels.

FIG. 1A is a schematic diagram showing a semiconductor device SA having first and second red pixels $P_{R1}$, and $P_{R2}$ and green and blue pixels $P_G$ and $P_B$. Each pixel has a photoelectric conversion element (e.g., photodiode) formed on a semiconductor substrate SS and a color filter disposed above the conversion element. The color of a color filter corresponds to the color of the pixel.

Figure 1B:
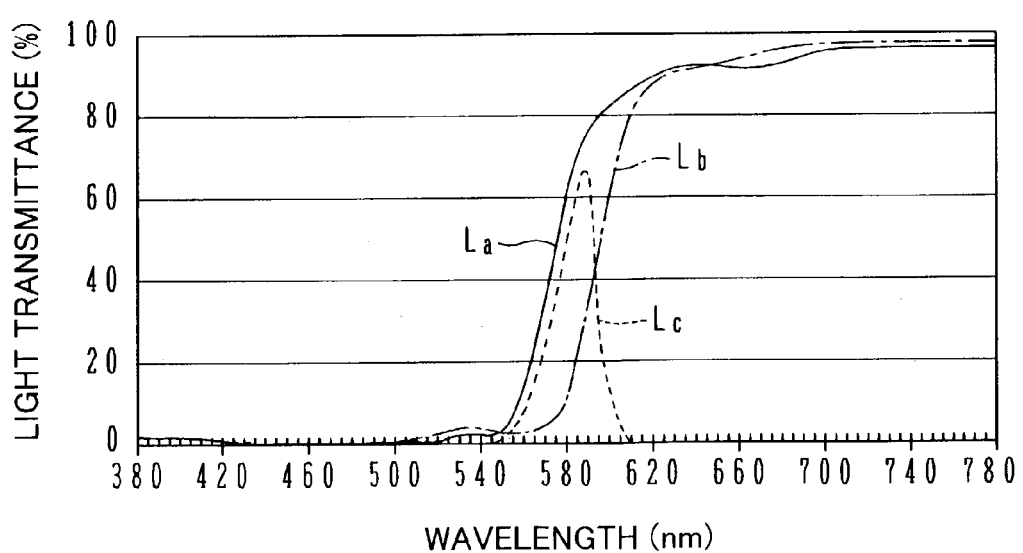
FIG. 1B is a graph showing spectral transmission factors of first and second red filters constituting the first and second pixels.

FIG. 1B is a graph showing spectral transmission factors of first and second red filters R1 and R2 of the first and second red pixels $P_{R1}$, and $P_{R2}$. A solid line La in FIG. 1B represents a spectral transmission factor curve of the first red filter R1, and a one-dot chain line Lb represents a spectral transmission factor curve of the second red filter R2. The first and second red filters R1 and R2 have different characteristics of spectrum transmission factors.

If a difference between the spectrum sensitivities of the first and second red pixels $P_{R1}$, and $P_{R2}$ is acquired, the semiconductor device SA has substantial pixels of the fourth color. The pixel of the fourth color has a color filter having the spectrum transmission factors indicated by a one-dot chain line Lc in FIG. 1B.

If a color filter array of a solid state image pickup device has two types of red or green filters having different characteristics of spectral transmission factors, the type of a light source of illumination light can be distinguished at a high precision by using output signals from the solid state image pickup device, or by using the semiconductor device described above.

Figure 2:
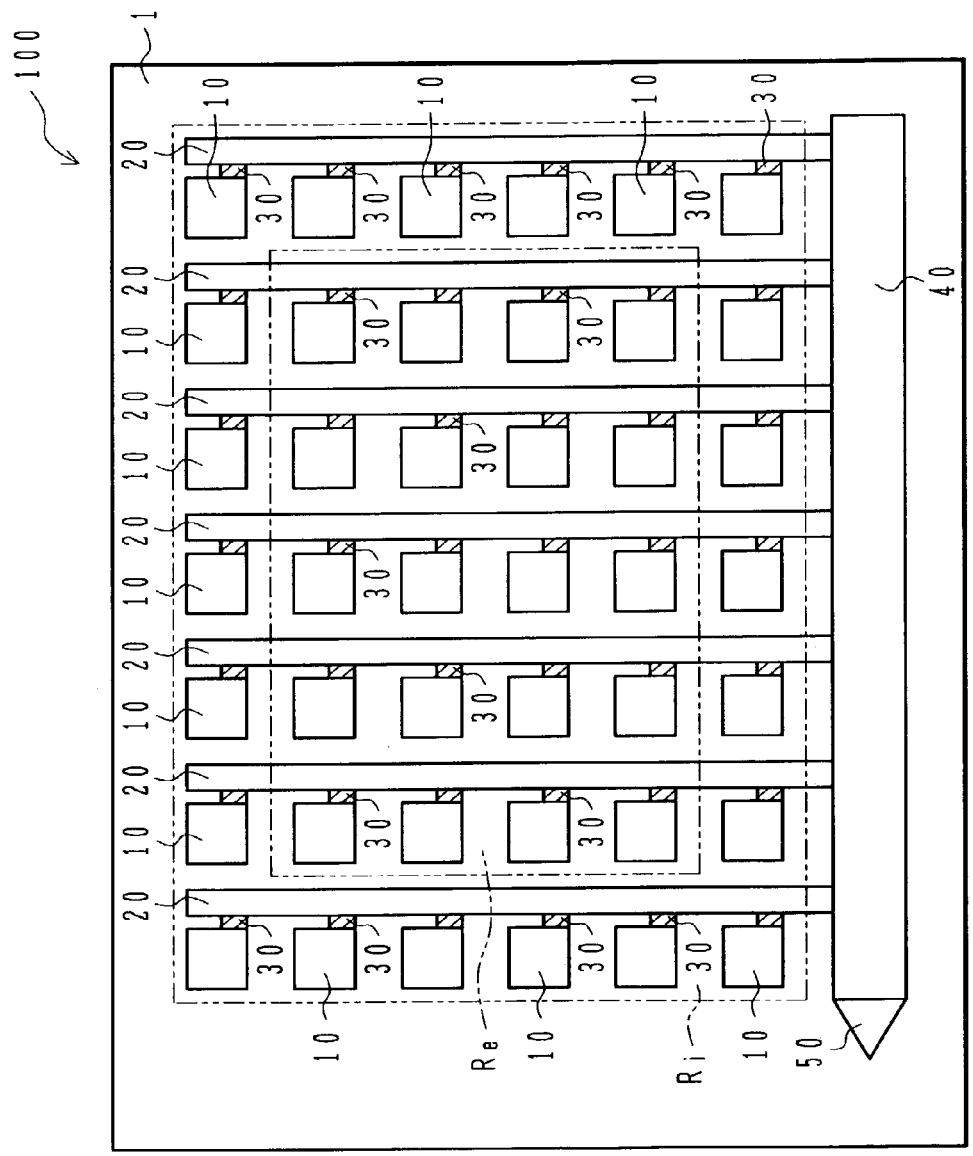
FIG. 2 is a schematic plan view showing the layout of a solid image pickup device having photoelectric conversion elements, vertical charge transfer units, a horizontal charge transfer unit and a charge detector circuit according to a first embodiment of the invention.

FIG. 2 is a schematic plan view showing the layout of a solid state image pickup device 100 according to a first embodiment, the image pickup device having photoelectric conversion elements 10, vertical charge transfer units 20, a horizontal charge transfer unit 40 and a charge detector circuit 50.

The solid state image pickup device 100 is used as an area image sensor. A number of photoelectric conversion elements 10 are disposed in a tetragonal matrix shape (including a rectangular matrix having different numbers of rows and columns) in rows and columns in an area from an effective pixel area Re to an invalid pixel area Ri defined on the surface of a semiconductor substrate 1.

In the example shown in FIG. 2, forty-two photoelectric conversion elements are disposed along six rows and seven columns. In practice, the total number of photoelectric conversion elements 10 of a solid image pickup device used as an area image sensor is about several hundred thousand to fifteen million. About 80% to 98% of photoelectric conversion elements of a single plate type solid state image pickup device are disposed in the effective pixel area Re, and the rest is disposed in the invalid pixel area Ri.

Each photoelectric conversion element 10 in the effective pixel area Re corresponds to a set of pixels of a reproduced image. A set of pixels of a reproduced image is constituted of red, green and blue pixels. Of the set of pixels, two pixels are reproduced from pixel signals (output pixel signal or record pixel signal) generated through an interpolation process by a video signal generator of an image pickup apparatus to be described later.

Each photoelectric conversion element 10 in the invalid area Ri is only necessary for the interpolation process of generating a pixel signal for a reproduced image, and has no corresponding pixel in the reproduced image.

Each of the photoelectric conversion elements 10 is made of, e.g., an embedded pn photodiode having a rectangular shape as viewed in plan. Upon incidence of light, electric charges are accumulated in the photoelectric conversion element 10.

One vertical charge transfer unit 20 is disposed along each photoelectric conversion element column to transfer electric charges accumulated in each photoelectric conversion element 10 to the charge detector circuit 50. Each vertical charge transfer unit 20 is constituted of, for example, four-phase drive type CCDs.

In order to control reading electric charges from the photoelectric conversion elements 10, each vertical charge transfer unit 20 is provided with a read gate 30 per each photoelectric conversion element. In FIG. 2, the read gate 30 is shown hatched.

When a read pulse (e.g., about 15 V) is applied to the read gate 30, electric charges are read from the photoelectric conversion element 10 corresponding to the read gate 30 to the vertical charge transfer unit 20.

Reading electric charges from the photoelectric conversion elements 10 to the vertical charge transfer units 20 is performed in the unit of photoelectric conversion element row or for all photoelectric conversion elements at the same time.

The vertical charge transfer unit 20 is driven by predetermined drive signals and sequentially transfers the charges read from the photoelectric conversion elements 10 to the horizontal charge transfer unit 40.

For example, the horizontal charge transfer unit 40 is made of two-phase drive type CCDs. The horizontal charge transfer unit 40 is driven by two-phase drive signals and transfers charges of each row supplied from the vertical charge transfer units 20 to the charge detector circuit 50.

The charge detector circuit 50 sequentially detects the charges transferred from the horizontal charge transfer unit 40 to generate a voltage signal, amplify it and form a pixel signal.

The charge detector circuit 50 may be formed of: an output gate electrically connected to the output terminal of the horizontal charge transfer unit 40; a floating diffusion region (hereinafter abbreviated to "FD region) formed in the semiconductor substrate 1 adjacent to the output gate; and a floating diffusion amplifier (hereinafter abbreviated to "FDA") electrically connected to the FD region.

A reset transistor is formed by using the FD region as its source. Charges after detected by FDA or charges unnecessary for detection by FDA are drained from the FD region to the drain of the reset transistor and absorbed in, for example, a power supply voltage.

In this solid state image pickup device 100, an output signal generating unit is constituted of the vertical charge transfer units 20, the horizontal charge transfer unit 40 and the charge detector circuit 50.

Although not shown in FIG. 2, similar to a conventional CCD type solid state image pickup device, the solid state image pickup device 100 has a first electrically insulating film, various electrodes, a second electrically insulating film, a light shielding film, an interlayer insulating film, a passivation film, and a planarizing film, sequentially deposited on the semiconductor substrate 1, and a color filter array formed thereon. If necessary, a micro lens array is disposed above the color filter array.

One characteristic feature of the solid state image pickup device 100 is the spectral sensitivity distribution of the color filter array.

Figure 3:
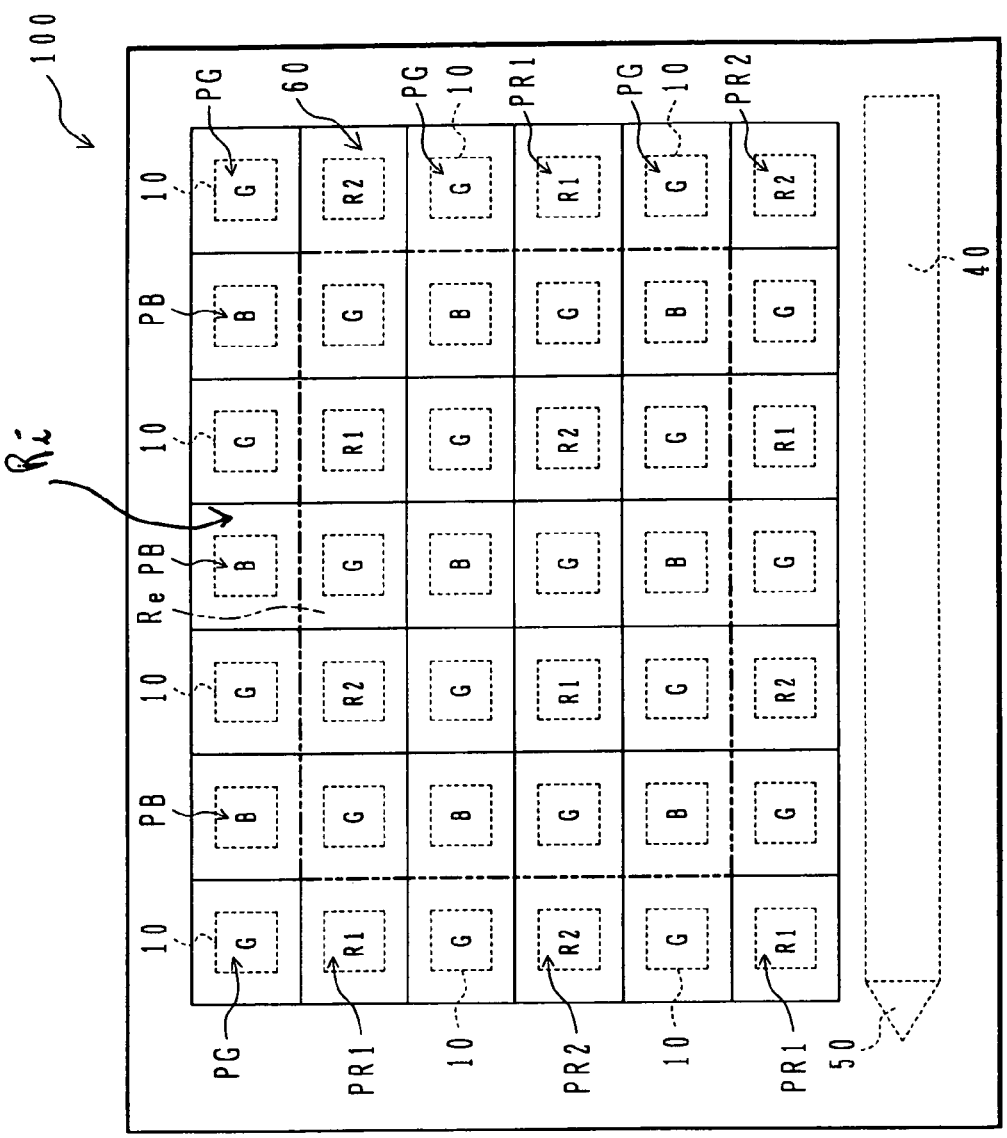
FIG. 3 is a schematic plan view showing a color filter array of the solid image pickup device shown in FIG. 2.

FIG. 3 is a schematic plan view showing the color filter array 60 of the solid image pickup device 100. In order to make it easy to grasp the positional relation between the color filter array 60 and the underlying members, the photoelectric conversion elements 10, horizontal charge transfer unit 40 and charge detector circuit are indicated by broken lines. The boundary between the effective pixel region Re and invalid pixel region Ri as viewed in plan is indicated by a two-dot chain line.

The color filter array 60 is a Bayer type primary color filter array. A large difference from a conventional primary color filter array resides in the use of two types of red filters R1 and R2.

Paying attention to the layout of only red filters, it can be found that red filters R1 and R2 are alternately disposed along both row and column directions. Reference symbol G represents a green filter, and reference symbol B represents a blue filter. Each of the filters R1, R2, G and B has a rectangular shape as viewed in plan.

The red filter R1 and underlying photoelectric conversion element 10 constitute a red pixel PR1, and the red filter R2 and underlying photoelectric conversion element 10 constitute a red pixel PR2. The green filter G and the underlying photoelectric conversion element 10 constitute a green pixel PG, and the blue filter B and the underlying photoelectric conversion element 10 constitute a blue pixel PB.

Figure 4:
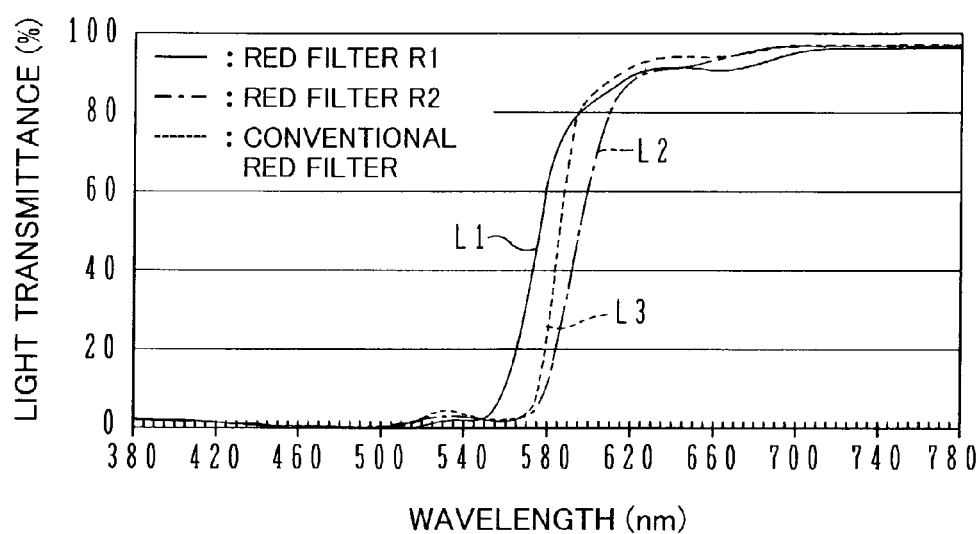
FIG. 4 is a graph showing the spectral transmission factors of two types of red filters shown in FIG. 3.

FIG. 4 is a graph showing spectral transmission factors of the red filters R1 and R2 shown in FIG. 3. The solid line L1 in FIG. 4 indicates a spectral transmission factor curve of the red filter R1, and the one-dot chain line L2 indicates the spectral transmission factor curve of the red filter R2. For reference, an example of the spectral transmission factor curve of a conventional red filter is indicated by a broken line L3. These spectral transmission factor curves were obtained by simulation.

The red film R1 is made of color resin formed by dispersing PR209 which is one type of red pigments and PY139 which is one type of yellow pigments into transparent resin. The red filter R2 is made of color resin formed by dispersing two types of red pigments PR177 and PR254 and one type of yellow pigment PY139 into transparent resin. An average film thickness of each of the red filters R1 and R2 was in the range from 1 to 3 μm.

As seen from the graph of FIG. 4, the red filters R1 and R2 have different characteristics of spectral transmission factors whose values are particularly different in the wavelength range from 550 to 605 nm among others. In the wavelength range from 550 to 605 nm, the spectral transmission factor of the red filter R1 is larger than that of the red filter R2.

The amount of charges to be accumulated in each photoelectric conversion element 10 increases as the incident light amount increases unless the conversion element is saturated. The strength of each pixel signal reflects the amount of light incident upon the photoelectric conversion element 10 and generating pairs of electron/hole.

The pixel signal of the red pixel PR1 having the red filer R1 with a broader transmission range is therefore larger than that of the red pixel PR2 having the red filter R2 with a narrower transmission range. Each photoelectric conversion element also has the spectral sensitivity so that the spectral sensitivity of the pixel depends upon the spectral characteristics of the filter and photoelectric conversion element.

Figure 5:
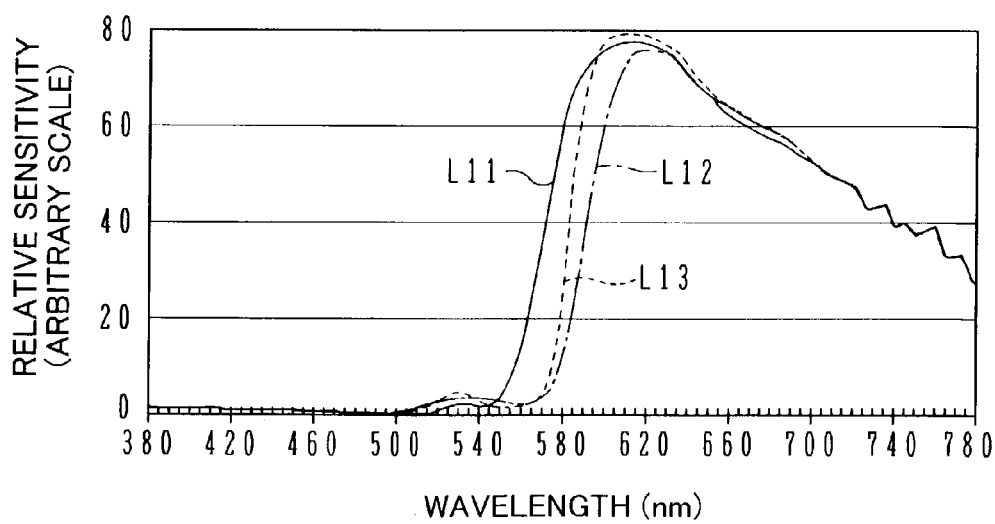
FIG. 5 is a graph showing the spectral sensitivity of the solid state image pickup device shown in FIG. 3.

FIG. 5 shows the spectral sensitivities of the red pixels PR1 and PR2 obtained through simulation.

A solid line L11 in FIG. 5 indicates the spectral sensitivity curve of the red pixel PR1, and a one-dot chain line L12 indicates the spectral sensitivity curve of the red pixel PR2. For reference, an example of the spectral sensitivity curve of a conventional red pixel is indicated by a broken line L13.

As seen from the graph of FIG. 5, the red pixels PR1 and PR2 of the solid image pickup device 100 have different characteristics of spectral sensitivities whose values are very different in the wavelength range from 555 to 605 nm among others.

By utilizing the difference between spectral sensitivities, the difference between the intensity of light incident upon the red pixel PR1 and that of light incident upon the red pixel PR2 can be known. Since this difference corresponds to the yellow wavelength range, it is hereinafter called "Ye sensitivity".

The Ye sensitivity can be calculated from a ratio represented by any one of the formulae (I), (II), (III) and (IV):

$$(S_{R1}-k_4 S_{R2})/(k_1 S_{R1}+k_2 S_{R2}+k_3 S_G) \quad (I)$$

where $S_{R1}$: an average output of signals generated from charges read from red pixels PR1; $S_{R2}$: an average output of signals generated from charges read from red pixels PR2; $S_G$: an average output of signals generated from charges read from green pixels PG; $k_1$, $k_2$, $k_3$, $k_4$: coefficient.

$$(S_{R1}-k_{11} S_{R2})/(k_{10} S_G) \quad (II)$$

where $S_{R1}$: an average output of signals generated from charges read from red pixels PR1; $S_{R2}$: an average output of signals generated from charges read from red pixels PR2; $S_G$: an average output of signals generated from charges read from green pixels PG; $k_{10}$, $k_{11}$: coefficients.

$$(S_{R1}-k_{22} S_{R2})/(k_{20} S_{R1}+k_{21} S_{R2}) \quad (III)$$

where $S_{R1}$: an average output of signals generated from charges read from red pixels PR1; $S_{R2}$: an average output of signals generated from charges read from red pixels PR2; $k_{20}$, $k_{21}$, $k_{22}$: coefficients.

$$(S_{R1}-k_{34} S_{R2}-k_{35} S_G-k_{36} S_B)/(k_{31} S_{R1}+k_{32} S_{R2}+k_{33} S_G) \quad (IV)$$

where $S_{R1}$: an average output of signals generated from charges read from red pixels PR1; $S_{R2}$: an average output of signals generated from charges read from red pixels PR2; $S_G$: an average output of signals generated from charges read from green pixels PG; $S_B$: an average output of signals generated from charges read from blue pixels PB; $k_{31}$, $k_{32}$, $k_{33}$ $k_{34}$, $k_{35}$, $k_{36}$: coefficients.

Each coefficient is properly selected in accordance with the characteristics of spectral transmission factors and the like of each of the filters R1, R2, G and B. Although most of the coefficients take 0 or a positive value, the coefficients $k_{35}$ and $k_{36}$ used in the formula (IV) take a negative value in some cases.

Each of the average outputs $S_{R1}$, $S_{R2}$, $S_G$ and $S_B$ is not required to be calculated by using all pixel signals in one frame output from the solid state image pickup device 100. Depending upon the distribution of red filters R1 and R2, the average outputs $S_{R1}$ and $S_{R2}$ and $S_G$ and/or $S_B$ may be calculated by using pixel signals of at least one set of adjacent red filters R1 and R2, and at least one set of green and/or blue filters adjacent to the red filters. The average output may also be calculated by using pixel signals of each of a plurality of divided areas of one frame of a scene.

In order to correctly distinguish the type of a light source of illumination light applied to an object, it is preferable that the Ye sensitivity is calculated from each of a plurality of divided areas, e.g., 64 areas of one frame of a scene. The Ye sensitivity may be calculated from a main object of a scene in one or some of a plurality of divided areas of one frame, like spot photometry.

If the formula (IV) among the formulae (I) to (IV) is used, the Ye sensitivity can be calculated easily even if the red, green and blue filters R, G and B are made thin (e.g., not more than about 2 μm thick).

As the color filter is made thin, the amount of leak light passing through the filter increases, which leak light is otherwise to be cut by the filter. With the formula (IV), since the contribution of the average outputs $S_G$ and $S_B$ is subtracted from the contribution of the average outputs of $S_{R1}$ and $S_{R2}$, it is possible to mitigate the influence of leak light of the red filters R1 and R2 in the wavelength range shorter than 555 nm.

As described earlier, a standard fluorescent lamp has a radiation peak near at 580 nm, and a three-wavelength fluorescent lamp has radiation peaks on longer and shorter wavelength sides than near at 580 nm. Sunlight and tungsten light (incandescent light) has no sharp peak and valley in the wavelength range from 555 to 605 nm.

By experimentally selecting beforehand each coefficient of the solid state image pickup device 100 and calculating the Ye sensitivity, it becomes possible to correctly judge whether the light incident upon the solid state image pickup device 100 is radiated either from a standard fluorescent lamp, a three-wavelength fluorescent lamp, an incandescent lamp, or the sun.

By using the solid state image pickup device 100 in an image pickup apparatus, the type of a light source can be distinguished more correctly than prior art techniques.

The structure of an image pickup apparatus using the solid image pickup device 100 will be described specifically.

Figure 6:
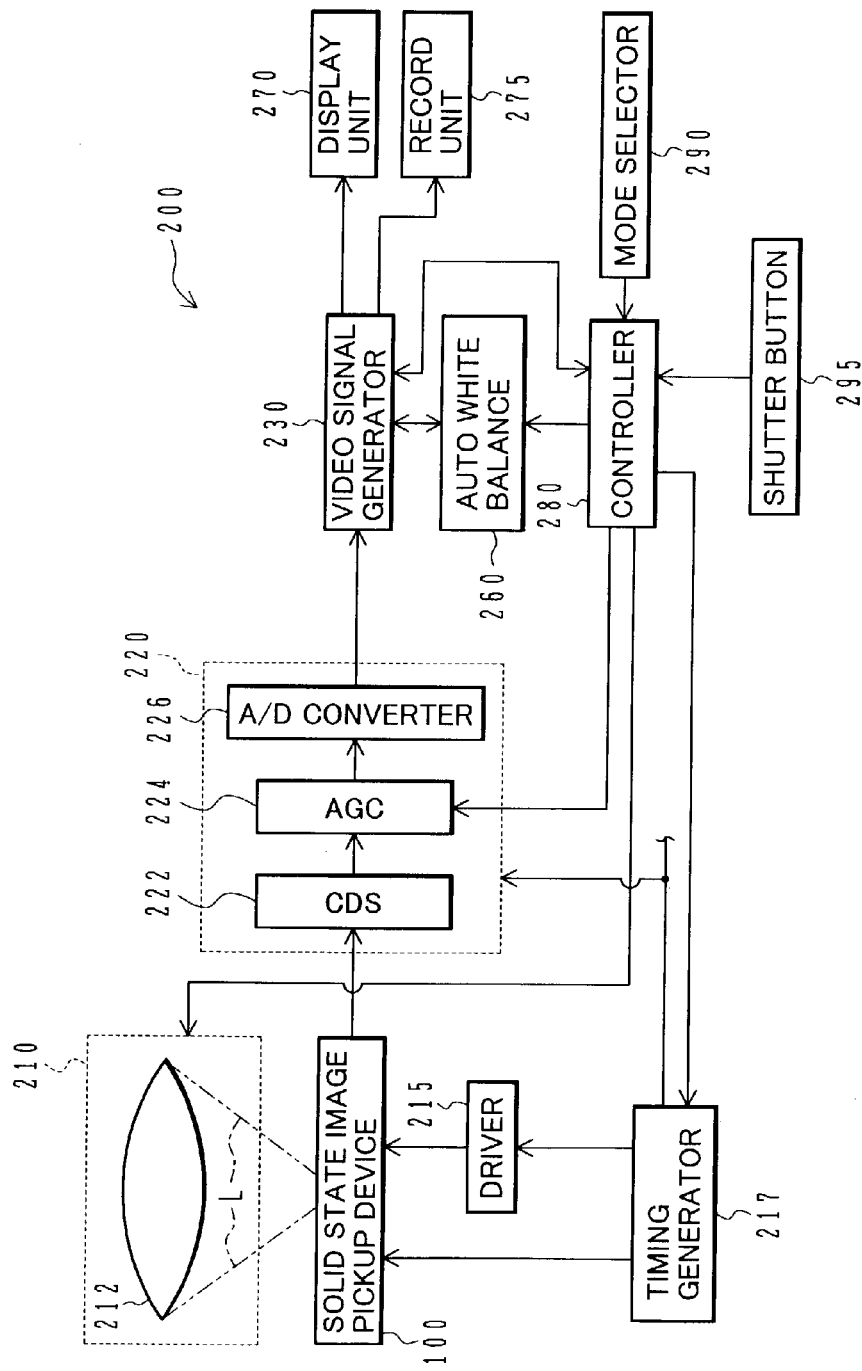
FIG. 6 is a schematic diagram of an image pickup apparatus.

FIG. 6 is a schematic diagram showing an image pickup apparatus (e.g., a digital still camera) according to an embodiment. An image pickup apparatus 200 uses the solid state image pickup device 100 of the first embodiment as an area image sensor. The solid state image pickup device 100 has already been described, and the description thereof is not duplicated.

In this image pickup apparatus 200, an image pickup optical system 210 focuses a light flux and forms the optical image of an object on the solid state image pickup device 100. The image pickup optical system 210 is constituted of, for example, a plurality of optical lenses, an optical lens drive mechanism for moving the lenses along the optical axis, an optical aperture, an optical aperture open/close mechanism for opening/closing the optical aperture, an optical low-pass filter, an infrared cut filter, a mechanical shutter and the like. In FIG. 6, a single optical lens 212 is representative of the image pickup optical system.

The solid state image pickup device 100 is driven by drive signals supplied from a driver 215 and a timing generator 217 and outputs a pixel signal.

In response to a signal supplied from the timing generator 217, the 10 driver 215 generates a drive signal for the vertical charge transfer unit 20 (refer to FIG. 2), a read pulse and the like and supplies these signals to the solid state image pickup device 100. For example, the driver 215 is constituted of a vertical driver, a DC power supply and the like.

The timing generator 217 generates a drive signal for the horizontal charge transfer unit 40 (refer to FIG. 2) and a signal for the charge detector circuit 50 (refer to FIG. 2) and supplies these signals to the solid state image pickup device 100. The timing generator 217 also generates timing signals and supplies them to various circuits of the image pickup apparatus 200 to synchronize the operations of these circuits.

A pixel signal output from the solid state image pickup device 100 is supplied to a digital signal generator 220 whereat it is converted into a digital signal. For example, the digital signal generator 220 is constituted of a correlated double sampling (CDS) circuit 222 for reducing noises, an automatic gain control AGC) circuit 224 for controlling a gain and an A/D converter 226 for converting an analog signal into a digital signal.

The CDS circuit 222 reduces noises contained in a pixel signal supplied from the solid image pickup device 100.

The AGC circuit 224 maintains the level of an output signal from the CDS circuit 222 in a proper range.

The A/D converter 226 converts an output signal from the AGC circuit 224 into a digital signal. A digital signal output from the A/D converter 226 is supplied to a video signal generator 230.

The video signal generator 230 generates a red signal, a green signal and a blue signal from the supplied digital signal and generates a pixel signal for image reproduction by using these signals.

An auto white balance circuit 260 receives the red, green and blue signals from the video signal generator 230, detects a color temperature of illumination light applied to an object and judges the type of a light source of illumination light. In accordance with the detected color temperature and the judged type of a light source, the auto white balance circuit 260 adjusts the levels of the red, green and blue signals in the video signal generator 230 to obtain a white balance.

The specific structures of the video signal generator 230 and auto white balance circuit 260 will be later described with reference to FIG. 8.

A display unit 270 displays a still image or a moving image by using the pixel signal (output pixel signal) for image reproduction supplied from the video signal generator 230. For example, the display unit is a liquid crystal display.

A record unit 275 records a pixel signal (record pixel signal) for image reproduction supplied from the video signal generator 230 in a recording medium such as a memory card.

A controller 280 controls the operations of the timing signal generator 217, video signal generator 230, auto white balance circuit 260 and the like in accordance with an operation mode selected by a mode selector 290 or the depression state of a shutter button 295. The controller 280 is, for example, a central processing unit (CPU).

The mode selector 290 selects the operation mode of the image pickup apparatus 200. The modes of the image pickup apparatus 200 include, for example, an auto exposure (AE) mode, an auto focus (AF) mode, a digital zoom mode, a still image mode, a moving image mode, and a continuous image pickup mode. The mode selector 290 is operated by a user of the image pickup apparatus 200.

When the shutter button 295 is half-depressed while the mode selector 290 selects the still image mode, the video signal generator 230 generates a range finding signal and a total exposure amount signal. In accordance with the total exposure amount signal supplied from the video signal generator 230, the controller 280 controls the optical aperture open/close mechanism of the image pickup optical system 210 and the AGC circuit 224, and in accordance with the range finding signal, controls the operation of the optical lens drive mechanism.

The white balance adjustment is preferably performed in accordance with the pixel signals of one frame generated by the solid state image pickup device 100, after the in-focus of the object and a proper exposure are obtained by the image pickup optical system 210.

Thereafter, when the shutter button 295 is full depressed, a still image is taken whose focus, exposure and white balance are properly controlled.

Signal processing, one of the characteristic features of the image pickup apparatus 200, will be further detailed. Prior to this description, the spectral sensitivity of the image pickup apparatus 200 will be described.

Figure 7:
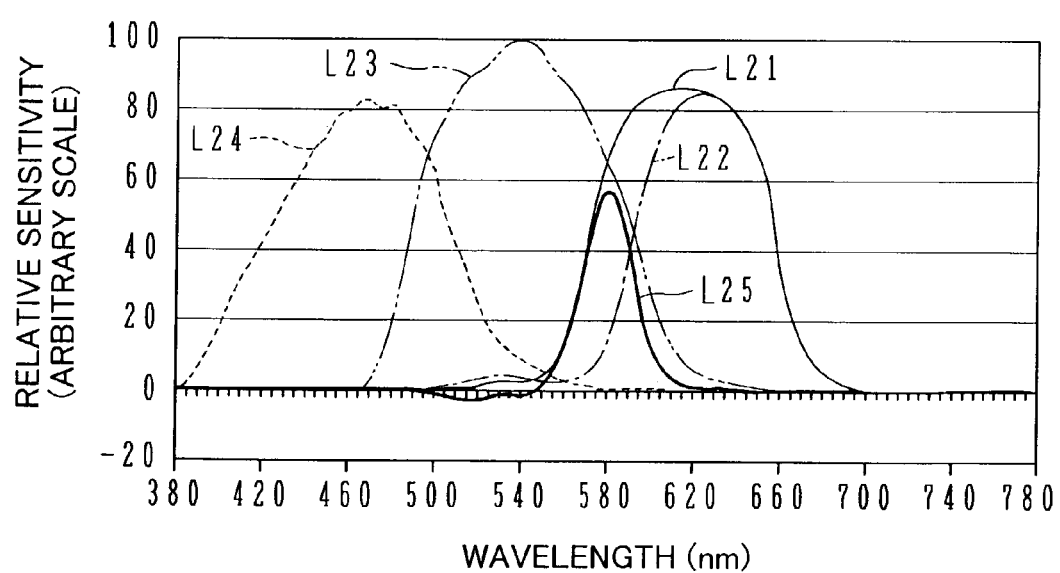
FIG. 7 is a graph showing the spectrum sensitivity of the image pickup apparatus shown in FIG. 6.

FIG. 7 shows the spectrum sensitivities of the red pixels PR1 and PR2, green pixel PG and blue pixel PB measured from pixel signals output from the solid state image pickup device 100 of the image pickup apparatus 200. In addition, the spectral sensitivity of the fourth color, Ye sensitivity, is also shown which is obtained from a spectral sensitivity difference between the red pixels PR1 and PR2.

A solid line L21 indicates the spectral sensitivity curve of the red pixel PR1, and a one-dot chain line L22 indicates the spectral sensitivity curve of the red pixel PR2. A two-dot chain line L23 indicates the spectral sensitivity curve of the green pixel PG, and a broken line L24 indicates the spectral sensitivity curve of the blue pixel PB. A bold line L25 indicates the Ye sensitivity. All the spectral sensitivity curves were calculated from simulation.

The green filter G is made of color resin obtained by dispersing green pigments PG7 and PG36 and yellow pigment PY150 into transparent resin, and the blue filter B is made of color resin obtained by dispersing blue pigments PB15:6 and purple pigment PV23 into transparent resin. The red filters R1 and R2 are made of color resin obtained in the manner described earlier. Each of the color filters has an average film thickness in the range from 1 to 3 μm.

The image pickup apparatus 200 adjusts white balance by judging from the Ye sensitivity the type of a light source of illumination light of an object.

Figure 8:
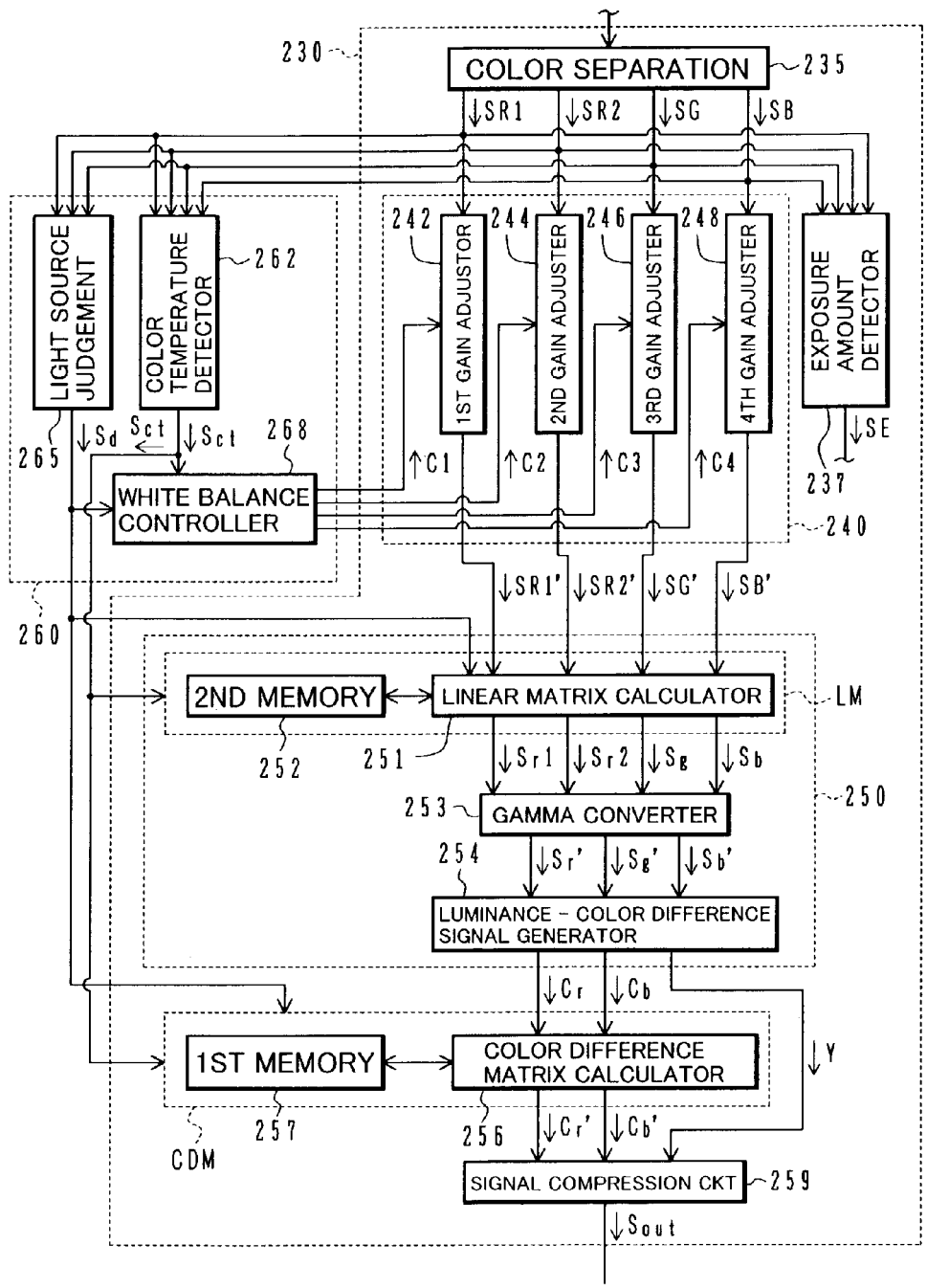
FIG. 8 is a schematic diagram showing an example of a main portion of an auto white balance circuit and a video signal generator of the image pickup apparatus shown in FIG. 6.

FIG. 8 shows an example of the main portion of the video signal generator 230 and auto white balance circuit 260 of the image pickup apparatus 200. In the following description, the Ye sensitivity is calculated from the formula (I) by way of example.

The video signal generator 230 has a color separation circuit 235, an exposure amount detector 237, a gain adjustor 240, a luminance—color difference signal generator 250, a color difference matrix calculator CDM, a signal compression circuit 259 and the like. The video signal generator 230 generates a total exposure amount signal, an in-focus signal and a pixel signal (output pixel signal and record pixel signal) for image reproduction.

First, the digital signal generated by the digital signal generator 220 is separated into red signals, a green signal SG and a blue signal SB by the color separation circuit 235. The red signals are divided into a first red signal SR1 derived from charges accumulated in the red pixels PR1 and a second red signal SR2 derived from charges accumulated in the red pixels PR2. The green signal SG is derived from charges accumulated in the green pixels PG and the blue signal SB is derived from charges accumulated in the blue pixels PB.

The color signals SR1, SR2, SG and SB are supplied to the exposure amount detector 237, range finding circuit (not shown), gain adjustor 240 and auto white balance circuit 260.

Using the supplied color signals SR1, SR2, SG and SB, the exposure amount detector 237 generates the total exposure amount signal SE and supplies it to the controller 280. The range finding circuit supplies an in-focus signal to the controller 280 by fetching pixel signals of a plurality of frames according to necessity. In accordance with the supplied signals, the controller 280 controls the image pickup optical system 210 to set a proper exposure value and makes the image pickup optical system 210 in the in-focus state of the object.

As described previously, the white balance adjustment is preferably performed in accordance with the pixel signals of one frame generated by the solid state image pickup device 100, after the in-focus of the object and a proper exposure are obtained by the image pickup optical system 210.

The white balance circuit 260 supplies the control signals and adjusts the levels of the color signals SR1, SR2, SG and SB supplied from the color separator 235 to the gain adjustor 240.

The gain adjustor 240 is constituted of first to fourth gain adjustors 242, 244, 246 and 248.

The first gain adjustor 242 receives the first red signal SR1 from the color separator 235 and a control signal Cl from the white balance circuit 260, and outputs a first red signal SR1' adjusted to a predetermined level.

The second gain adjustor 244 receives the second red signal SR2 from the color separator 235 and a control signal C2 from the white balance circuit 260, and outputs a second red signal SR2' adjusted to a predetermined level.

The third gain adjustor 246 receives the green signal SG from the color separator 235 and a control signal C3 from the white balance circuit 260, and outputs a green signal SG' adjusted to a predetermined level.

The fourth gain adjustor 248 receives the blue signal SB from the color separator 235 and a control signal C4 from the white balance circuit 260, and outputs a blue signal SB' adjusted to a predetermined level.

These adjusted color signals SR1', SR2', SG' and SB' are white-balanced color signals.

The auto white balance circuit 260 has a color temperature detector 262, a light source judgement circuit 265 and a white balance controller 268 and generates the control signals C1 to C4, for example, in the manner described below.

The color temperature detector 262 detects the color temperature of illumination light applied to the object (i.e. color temperature of the light source) by using the color signals SR1, SR2, SG and SB supplied from the color separator 235, and outputs a signal Sct representative of the detection result.

The light source judgment circuit 265 calculates an average output of each of the color signals SR1, SR2 and SG supplied from the color separator 235, and calculates the Ye sensitivity from the formula (I). The light source judgement circuit 265 judges the type of the light source from the calculated Ye sensitivity and outputs a signal Sd representative of the judgement result.

The coefficients $k_1$, $k_2$, $k_3$ and $k_4$ use the initial values set at the shipping time of the image pickup apparatus 200 in accordance with the spectral sensitivity characteristics of the red pixels PR1 and PR2 and green pixel PG and the gains of the gain adjustors 242, 244, 246 and 248.

The Ye sensitivity is affected by a variation (e.g., of film thickness of color filters) in the manufacture of the solid state image pickup device 100 and a variation (e.g., of infrared cut filters) in the manufacture of the image pickup apparatus 200, and there is also a variation in the Ye sensitivities among image pickup apparatuses. In order to avoid a judgement error of the type of a light source, it is preferable, for example, that the gain of the light source judgement circuit 265 is adjusted so that the value of the formula (I) takes a constant value, as calculated by the light source judgement circuit 265 by taking an image of a gray plate placed under a predetermined light source at the shipping time of the image pickup apparatus 200.

The signal Sct output from the color temperature detector 262 and the signal Sd output from the light source judgement circuit 265 are supplied to the white balance controller 268.

The white balance controller 268 has a memory which stores data representative of the relation between the control signals to be generated and the type of a light source and the color temperature of a light source. The white balance controller 268 reads data corresponding to the supplied signals Sct and Sd from the memory to generate the control signals C1 to C4.

By adjusting the gains of the gain adjustor 240 with the control signals C1 to C4, the adjusted first and second red signals SR1' and SR2' and adjusted green and blue signals SG' and SB' respectively white-balanced can be obtained. If necessary, the gain of the AGC circuit 224 (refer to FIG. 6) is adjusted by the control signals C1 to C4.

Since the adjusted first and second red signals SR1' and SR2' are white-balanced, they may be used as one adjusted red signal without discrimination between them at the later signal processing.

The image pickup optical system 210 is made in an in-focus state of the object, the exposure is set to a proper value, and the gains of the gain adjustor 240 are adjusted to obtain a white balance. When the shutter button 295 (refer to FIG. 6) is full depressed in this state, the video signal generator 230 generates pixel signals (output pixel signal and record pixel signal) for image reproduction.

Signal processing for generating pixel signals for image reproduction will be described.

The gain adjustor 240 generates the adjusted color signals SR1', SR2', SG' and SB' respectively white-balanced and supplies them to the luminance—color difference signal generator 250.

The luminance—color difference signal generator 250 includes an interpolation circuit, the gamma conversion circuit 253 and a luminance—color difference signal generator circuit 254. If necessary, it also includes a linear matrix calculator LM.

The linear matrix calculator LM has a linear matrix calculator circuit 251 and a second memory 252.

The linear matrix calculator LM receives the adjusted color signals SR1', SR2', SG and SB generated by the gain adjustor 240, the signal Sd output from the light source judgement circuit 265 and the signal Sct output from the color temperature detector 262.

Predetermined calculation coefficients corresponding to the signal Sd or Sct are supplied from the second memory 252 to the linear matrix calculator circuit 251.

Using these calculation coefficients, the linear matrix calculator circuit 251 performs a linear matrix calculation of the following formula (V) for the adjusted color signals SR1', SR2', SG' and SB', and outputs corrected first and second red signals Sr1 and Sr2 and corrected green and blue signals Sg and Sb:

$$\begin{array}{c} Sr1 \\ Sr2 \\ Sg \\ Sb \end{array} \quad \begin{array}{cccc} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{array} \quad \begin{array}{c} SR1' \\ SR2' \\ SG' \\ SB' \end{array} \quad (V)$$

where $a_{11}$ to $a_{44}$ are calculation coefficients read from the second memory 252.

With this matrix calculation, a difference between the adjusted first and second red signals SR1' and SR2' can be cancelled out so that a uniform image can be reproduced easily. In order to suppress the generation of a false color, it is preferable that the linear matrix calculator circuit 251 performs a matrix calculation of the following formula (VI):

$$\begin{array}{c} Sr1 \\ Sr2 \\ Sg \\ Sb \end{array} \quad \begin{array}{cccc} a_{11} & a_{12} & a_{13} & 0 \\ a_{21} & a_{22} & a_{23} & 0 \\ 0 & 0 & 1 & 0 \\ 0 & 0 & a_{43} & a_{44} \end{array} \quad \begin{array}{c} SR1' \\ SR2' \\ SG' \\ SB' \end{array} \quad (VI)$$

The corrected first and second red signals Sr1 and Sr2 and corrected green and blue signals Sg and Sb generated by the linear matrix calculator circuit 251 are output from the linear matrix calculator LM.

The corrected first and second red signals Sr1 and Sr2 can be processed without any discrimination therebetween. In the following description, these first and second red signals are collectively called a corrected red signal Sr without any discrimination.

The gamma conversion circuit 253 performs gamma conversion for the received corrected red, green and blue signals Sr, Sg and Sb to generate converted red, green and blue signals Sr', Sg' and Sb' which are supplied to the luminance—color difference signal generator circuit 254.

Using the converted color signals Sr', Sg' and Sb', the luminance—color difference signal generator circuit 254 generates a luminance signal Y, a first red difference signal Cr and a first blue difference signal Cb which are output from the luminance—color difference generator 250.

Of these output signals, the first red and blue difference signals Cr and Cb are supplied to the color difference matrix calculator CDM, and the luminance signal Y is supplied to the signal compression circuit 259.

The color difference matrix calculator CDM has a color difference matrix calculator circuit 256 and a first memory 257.

The first color difference signals Cr and Cb generated by the luminance—color difference signal generator circuit 250 are supplied to the color difference matrix calculator circuit 256. The signal Sd output from the light source judgement circuit 265 and the signal Sct output from the color temperature detector 262 are supplied to the color difference matrix calculator CDM.

Predetermined calculation coefficients corresponding to the signal Sd or Sct are supplied from the first memory 257 to the color difference matrix calculator circuit 256.

Using these calculation coefficients, the color difference signal calculator circuit 256 performs a color difference matrix calculation for the first color difference signals Cr and Cb to generate second red and blue difference signals Cr' and Cb' which are output from the color difference matrix calculator CDM.

The second color difference signals Cr' and Cb' are supplied to the signal compression circuit 259 whereat they are compressed together with the luminance signal Y. A signal $S_{out}$, i.e., the output pixel signal or record pixel signal, is thus output from the video signal generator 230.

Which one of the output pixel signal and record pixel signal is to be generated by the video signal generator 230 is determined by the mode selected by the mode selector 290 (refer to FIG. 6).

Studies of a light source judgement function of the light source judgement circuit 265 of the image pickup apparatus 200 were made through simulation.

In this simulation, colors of a gray plate, Japanese flesh and a broadleaf were taken with the image pickup apparatus 200 under various illumination conditions, and Ye sensitivities calculated by the light source judgement circuit 265 were obtained. The coefficients $k_1$ and $k_2$ of the formula (I) used for the calculation of the Y sensitivity were set to 0.25 and the coefficients $k_3$ and $k_4$ were set to 1.

Figure 9:
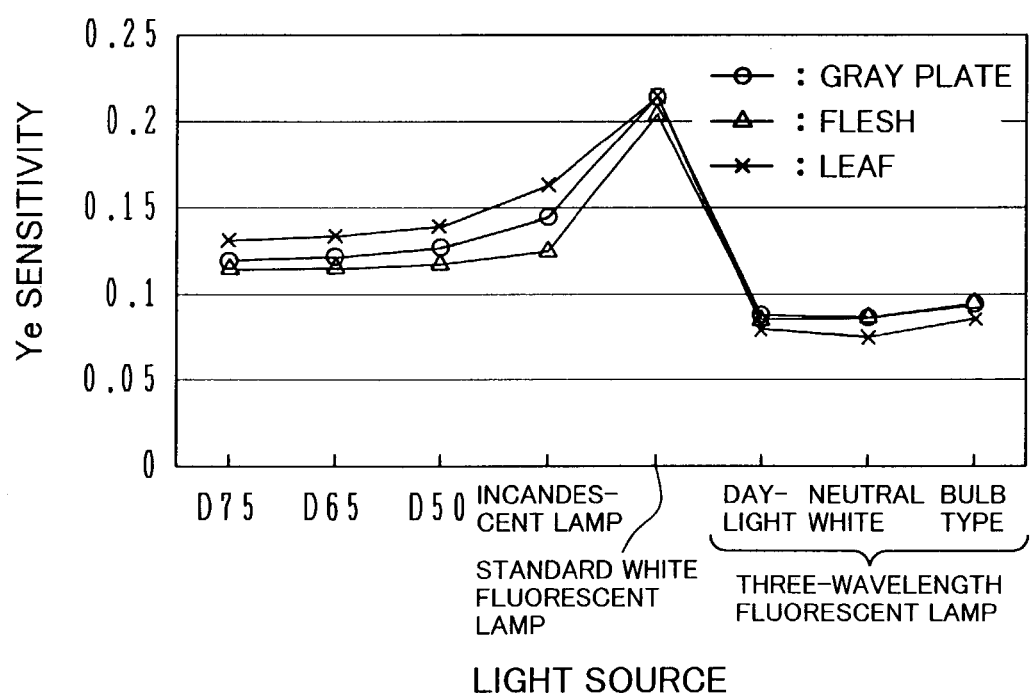
FIG. 9 is a graph showing the simulation results of a light source distinguishing function of the image pickup apparatus shown in FIG. 6.

FIG. 9 shows the simulation results. D75 represents standard light $D_{75}$, D65 represents standard light $D_{65}$, and D50 represents standard light $D_{50}$. An incandescent lamp, a standard white fluorescent lamp and three-wavelength fluorescent lamps were also used as the light sources.

As seen from FIG. 9, the Ye sensitivity calculated by the light source judgement circuit 265 under illumination by a standard white fluorescent lamp is higher than under illumination by any other lamp, for all the objects.

Under illumination by three-wavelength fluorescent lamps, the Ye sensitivity is lower than under illumination by any other lamp, for all the objects.

It is therefore possible for the image pickup apparatus 200 to distinguish between the standard white fluorescent lamp, three-wavelength fluorescent lamps, an incandescent lamp and the sun more correctly than a prior art method.

Similar effects to the standard white florescent lamp can be expected also for a standard daylight fluorescent lamp and a standard white fluorescent lamp, when their spectral distribution characteristics are taken into consideration.

If only the type of a light source can be judged correctly, it is possible to distinguish between three-wavelength fluorescent lamps including white, daylight and bulb type from the type of the light source and color temperature and to obtain a proper color balance.

If only the type of a light source can be judged correctly, a particular color of a reproduced image can be easily changed to the color actually sensed by a person while a proper white balance is maintained, by using predetermined values specific to the light source as the calculation coefficients to be used by the linear matrix calculator LM or color difference matrix calculator CDM. For example, a reproduced image of a person under illumination by a standard white fluorescent lamp can easily have a proper white balance and a flesh color very similar to that actually sensed by a human being.

It is also possible to reproduce the flesh color of a person under illumination by a standard white fluorescent lamp, which color has a flesh color under illumination by a desired light source, e.g., a flesh color under illumination by standard light $D_{65}$.

Next, a solid state image pickup device according to a second embodiment will be described.

Figure 10:
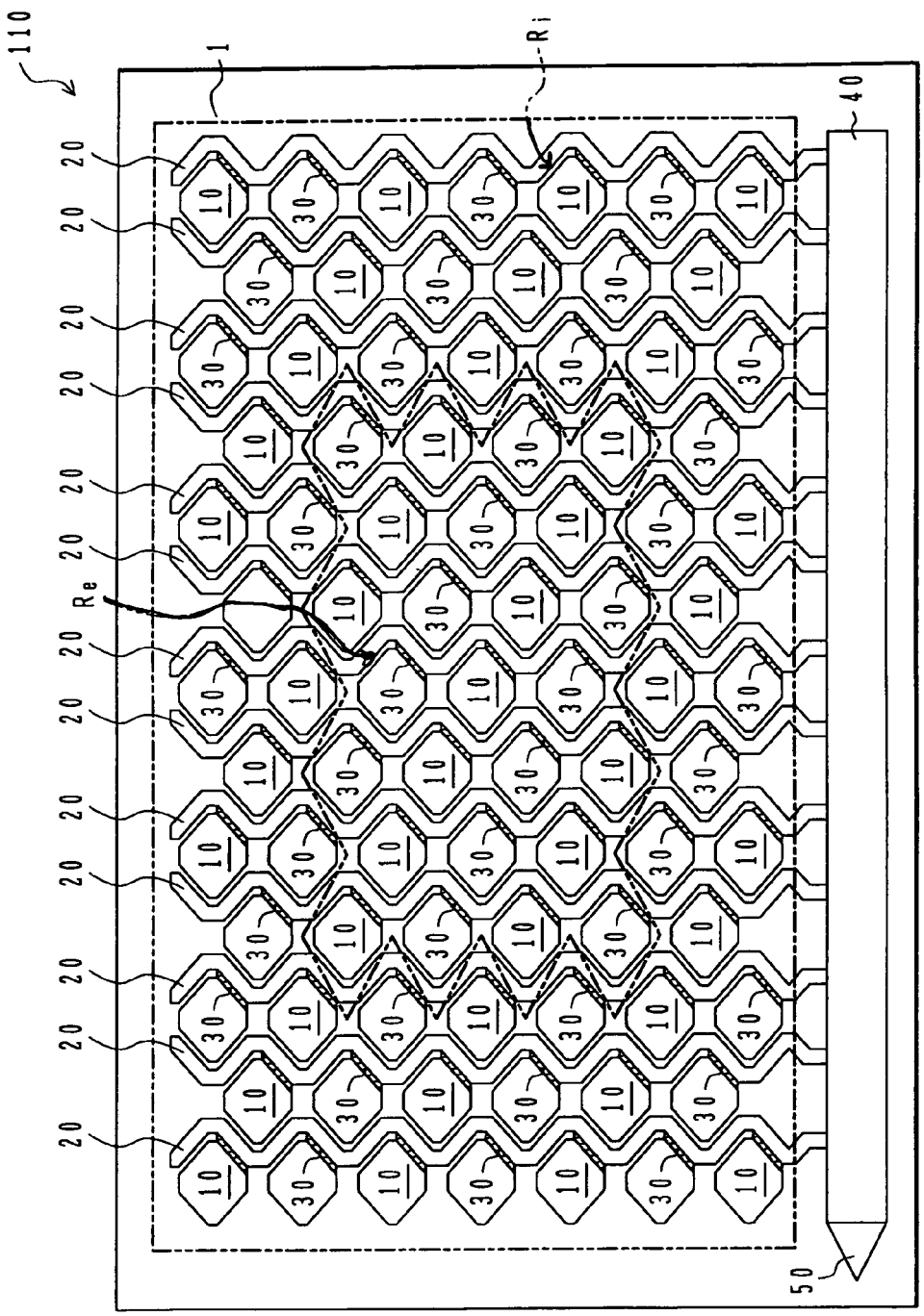
FIG. 10 is a schematic plan view showing the layout of a solid image pickup device having photoelectric conversion elements, vertical charge transfer units, a horizontal charge transfer unit and a charge detector circuit according to a second embodiment of the invention.

FIG. 10 is a schematic plan view showing the layout of photoelectric conversion elements 10, vertical charge transfer units 20, a horizontal charge transfer unit 40 and a charge detector circuit 50 respectively of a solid state image pickup device 110 of the second embodiment.

The solid image pickup device 110 has a similar structure to the solid state image pickup device 100 of the first embodiment, excepting that (i) a number of photoelectric conversion elements 10 are disposed in a pixel shift layout (honeycomb layout), (ii) each vertical charge transfer unit 20 has a zigzag shape, and (iii) a color filter array has a different structure.

In this specification, the "pixel shift layout" of a number of photoelectric conversion elements is intended to mean that each of photoelectric conversion elements of an even (odd) column is shifted by about a half pitch of photoelectric conversion elements along the column (row) direction from each of photoelectric conversion elements of an odd (even) column (row), and that each photoelectric conversion element column includes only the photoelectric conversion element of even (odd) rows. The "pixel shift layout" is one example of the layout in which a number of photoelectric conversion elements are disposed in rows and columns in a matrix shape.

The phrase "about a half pitch of photoelectric conversion elements along the column (row) direction" is intended to include just a half pitch and other values to be considered substantially equivalent to just a half pitch from the performance of a solid state image pickup device and an image quality although those values are different from just a half value because of manufacture errors, rounding errors of a pixel position in design or mask formation.

In FIG. 10, elements having a common function to those shown in FIG. 2 are represented by using identical reference numerals, and the description thereof is omitted. A number of photoelectric conversion elements 10 are disposed in a pixel shift layout and each vertical charge transfer unit 20 is disposed in a zigzag shape as shown in FIG. 10. The integration degree of photoelectric conversion elements 10 can therefore be raised easily.

Figure 11:
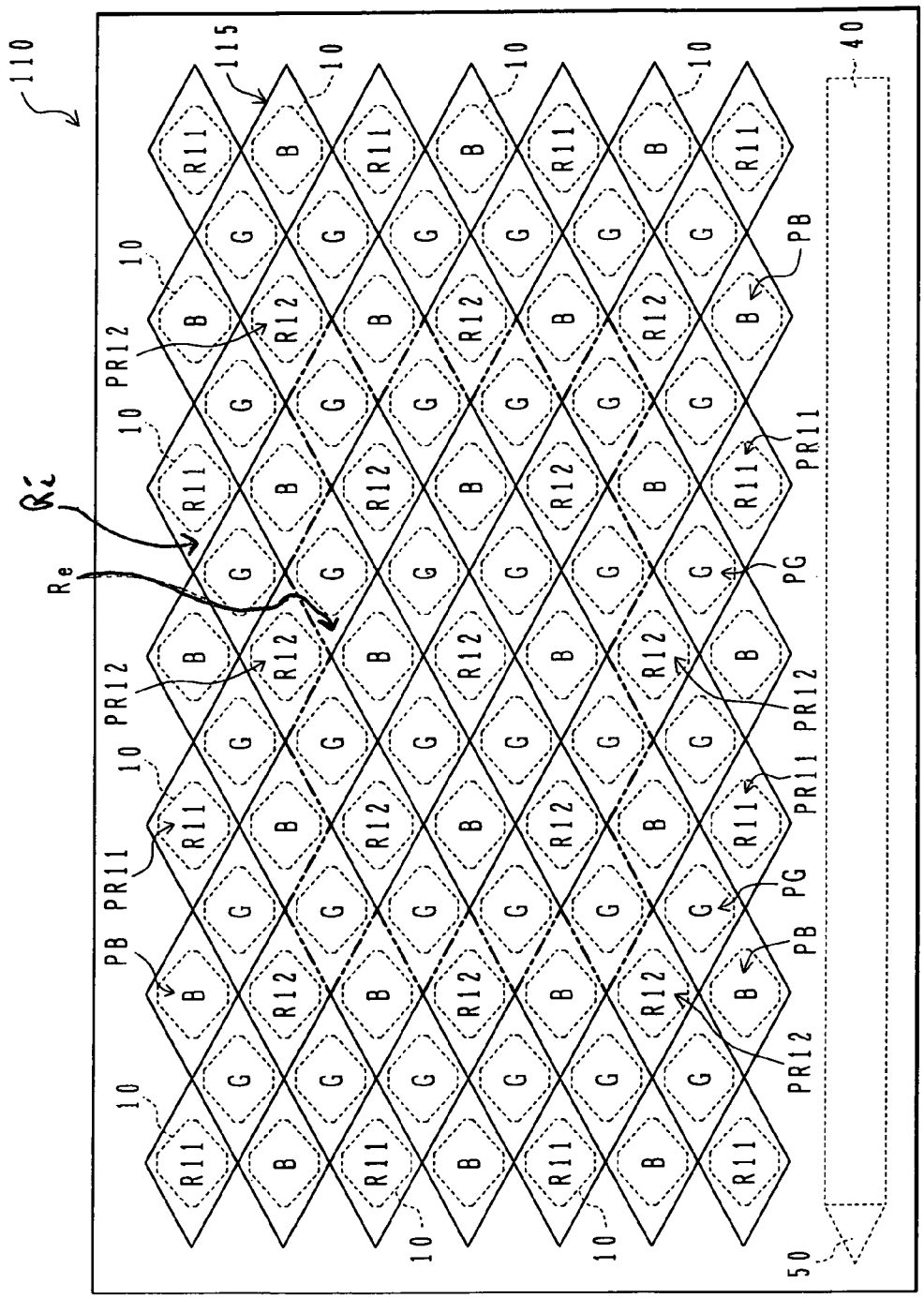
FIG. 11 is a schematic plan view showing a color filter array of the solid image pickup device shown in FIG. 10.

FIG. 11 is a schematic plan view of a color filter array 115 of the solid state image pickup device 110. The photoelectric conversion elements 10, horizontal charge transfer unit 40 and charge detector circuit 50 are indicated by broken lines. The boundary between an effective pixel area Re and an invalid pixel area Ri as viewed in plan is indicated by a two-dot chain line.

The color filter array 115 has first and second color filter rows alternately disposed. The first color filter row has red filters and blue filters alternately disposed, and the second color filter row has only green filters. In the first color filter rows on both sides of the second color filter row, the red and blue filters are reversed.

The color filter array 115 has two types of red filters R11 and R12 having different spectral transmission factors in the wavelength range from 550 to 605 nm.

Paying attention to the layout of only red filters R11 and R12, the effective pixel area Re has only red filters R12. In the invalid pixel area Ri, red filters R12 are disposed in an area just outside the effective pixel area Re and red filters R11 are disposed outside the red filters R12.

In FIG. 11, G represents a green color filter, and B represents a blue color filter. Although the color filters R11, R12, G and B are shown in a rhombus shape, in practice, each color filter has a square shape, a truncated tetragon or the like.

The red filter R11 and underlying photoelectric conversion element form a red pixel PR11, and the red filter R12 and underlying photoelectric conversion element 10 form a red pixel PR12. The green filter G and underlying photoelectric conversion element 10 form a green pixel PG, and the blue filter B and underlying photoelectric conversion element 10 form a blue pixel PB.

Since the two types of red pixels PR11 and PR12 are disposed only in the invalid pixel area, the spectral sensitivity characteristics of each of the red pixels PR11 and PR12 can be made different in accordance with the spectral transmission factor characteristics of the red filters R11 and R12, more than when the two types of red pixels are disposed also in the effective pixel area.

In this embodiment, the red filter R11 was made of color resin obtained by dispersing purple pigment PV23, red pigment PR81, and yellow pigment PY139 into transparent resin, and the red filter R12 was made of color resin obtained by dispersing red pigment PR254 and yellow pigment PY139 into transparent resin. An average thickness of each of the red filters R11 and R12 is in the range from 1 to 3 µm.

This solid state image pickup device 110 has similar effects to those of the solid image pickup device 100 of the first embodiment.

An image pickup apparatus using the solid state image pickup device 110 may have the structure shown in FIGS. 6 and 8. However, since the solid state image pickup device 110 has the photoelectric conversion elements in the pixel shift layout, the interpolation method by the video signal generator 230 (refer to FIG. 8) is different. Pixel signals for image reproduction can be generated by interpolation as if there are photoelectric conversion elements between adjacent elements along the row and column directions.

Figure 12:
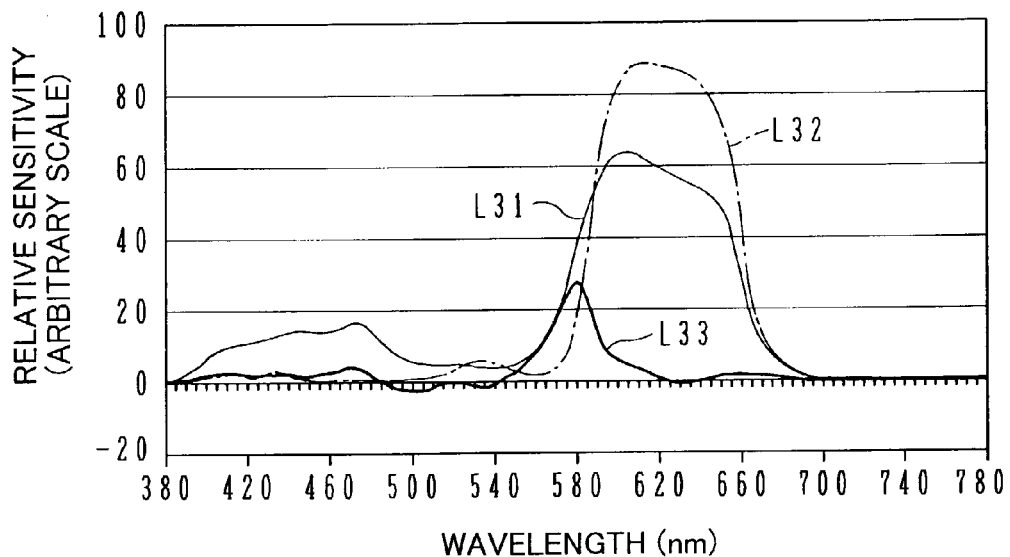
FIG. 12 is a graph showing the spectral sensitivity of an image pickup apparatus using the solid state image pickup device shown in FIG. 10.

FIG. 12 shows the spectral sensitivities of an image pickup apparatus. The spectral sensitivity curve of the red pixel PR11 is indicated by a solid line L31, and that of the red pixel PR12 is indicated by a one-dot chain line L32.

As seen from FIG. 12, the spectral sensitivities of the red pixels PR11 and PR12 are considerably different in the wavelength range from 550 to 605 nm.

The Ye sensitivity (spectral sensitivity) using $k_{34}=0.66$, $k_{35}=0$ and $k_{36}=0.13$ as the coefficients of the numerator of the formula (IV) is shown by a bold solid line L33 in FIG. 12.

The spectral sensitivity curves shown in FIG. 12 were obtained through simulation of the image pickup apparatus having the solid state image pickup device 110.

In calculating the Ye sensitivity by using the formula (IV), the light source judgement circuit 265 is supplied with the first and second red signals SR1 and SR2 and green and blue signals SG and SB (refer to FIG. 8). The first red signal SR1 is derived from charges accumulated in the red pixels PR11, and the second red signal SR2 is derived from charges accumulated in the red pixels PR12. The green signal SG is derived from charges accumulated in the green pixels PG, and the blue signal SB is derived from charges accumulated in the blue pixels PB.

Simulation similar to the simulation described with reference to FIG. 9 was performed for an image pickup apparatus having the Ye sensitivities shown in FIG. 12.

For this simulation, the Ye sensitivity using the formula (IV) was performed by setting the coefficient values as $k_{31}=0$, $k_{32}=0.3$, $k_{33}=1$, $k_{34}=0.66$, $k_{35}=0$ and $k_{36}=0.13$. It was assumed that the green and blue filters G and B of the color filter array 115 had the same spectral sensitivities as those shown in FIG. 7.

Figure 13:
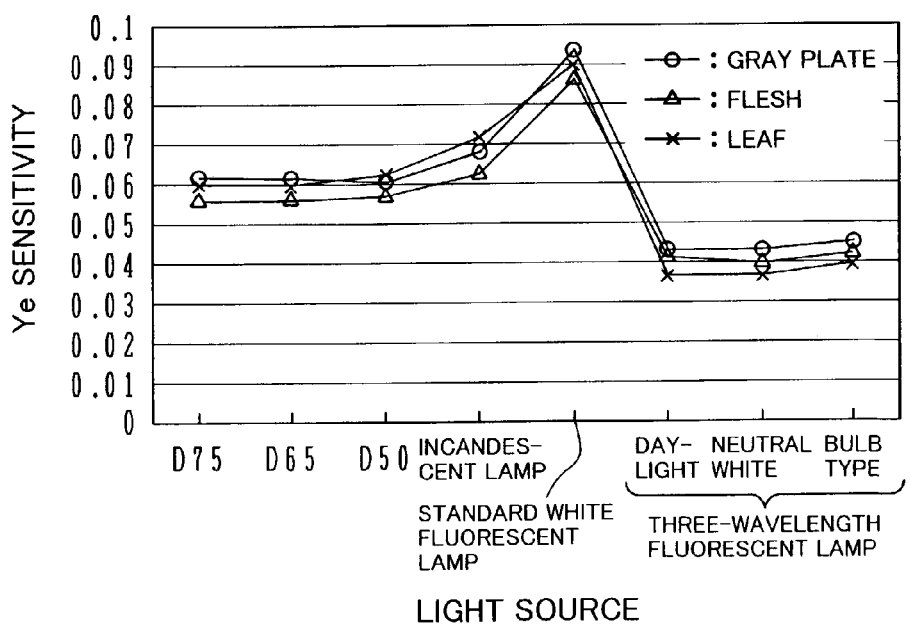
FIG. 13 is a graph showing the simulation results of a light source distinguishing function of the image pickup apparatus using the solid state image pickup device shown in FIG. 10.

FIG. 13 shows the simulation result. As seen from FIG. 13, this simulation shows the same result as the simulation described with reference to FIG. 9.

It is therefore possible to judge whether the light source is a standard white fluorescent lamp, three-wavelength fluorescent lamps, an incandescent lamp or the sun more correctly than a prior art method.

Next, a solid state image pickup device according to a third embodiment will be described.

Figure 14:
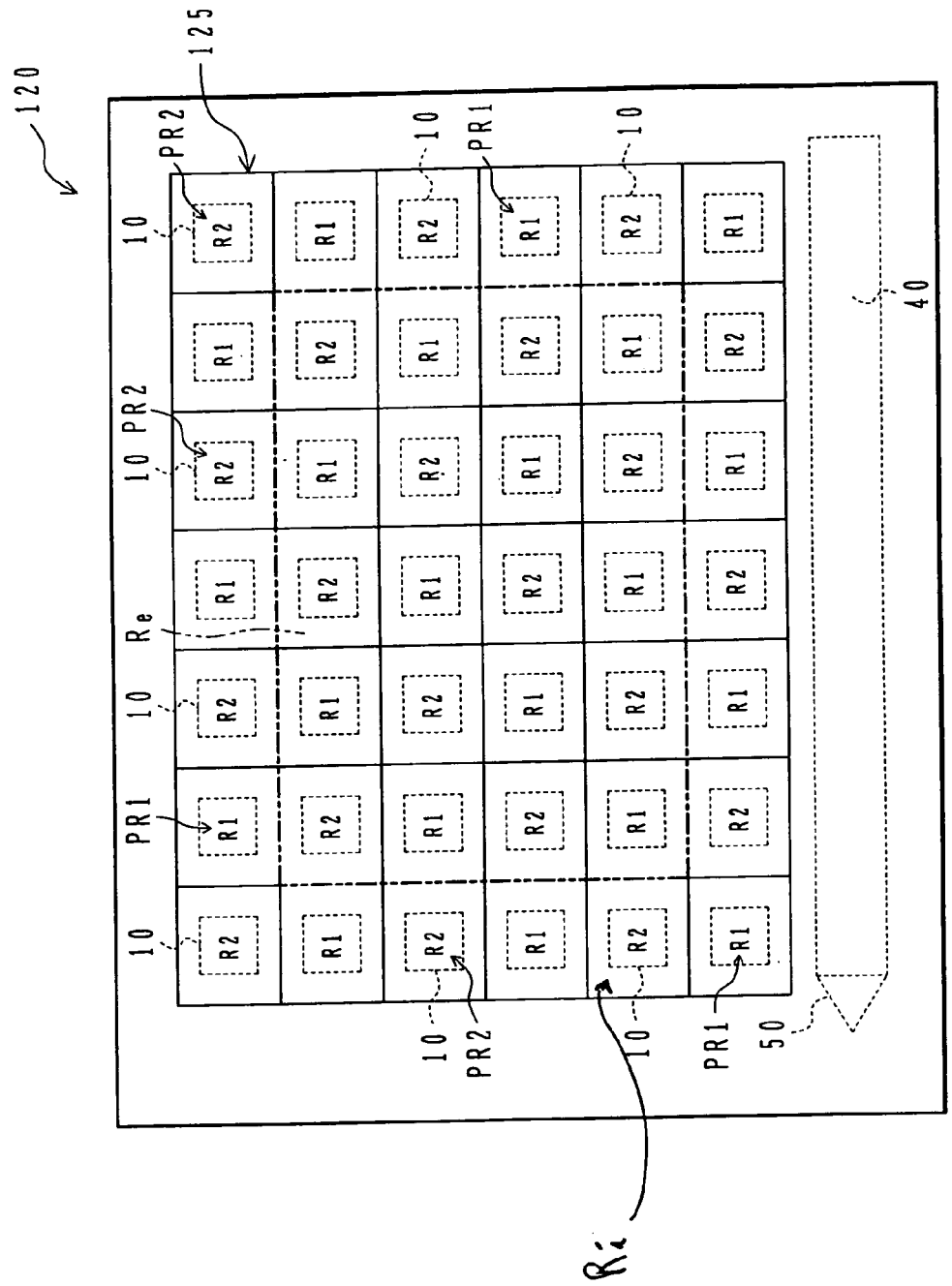
FIG. 14 is a schematic plan view showing a color filter array of a solid image pickup device according to a third embodiment.

FIG. 14 is a schematic plan view of a color filter array 125 of a solid state image pickup device 120 of the third embodiment. The solid state image pickup device 120 has a similar structure to that of the solid image pickup device 100 of the first embodiment, excepting the structure of the color filter array 125.

Three solid state image pickup devices 120 are used for a three-plate type image pickup apparatus. The color filter array 125 is made of only red filters R1 and R2. Red filters R1 and R2 are alternately disposed both in the row and column directions.

The three-plate type image pickup apparatus using three solid image pickup devices 120 has similar effects to those of the image pickup apparatus 200 shown in FIG. 6.

Next, a solid state image pickup device according to a fourth embodiment will be described.

Figure 15:
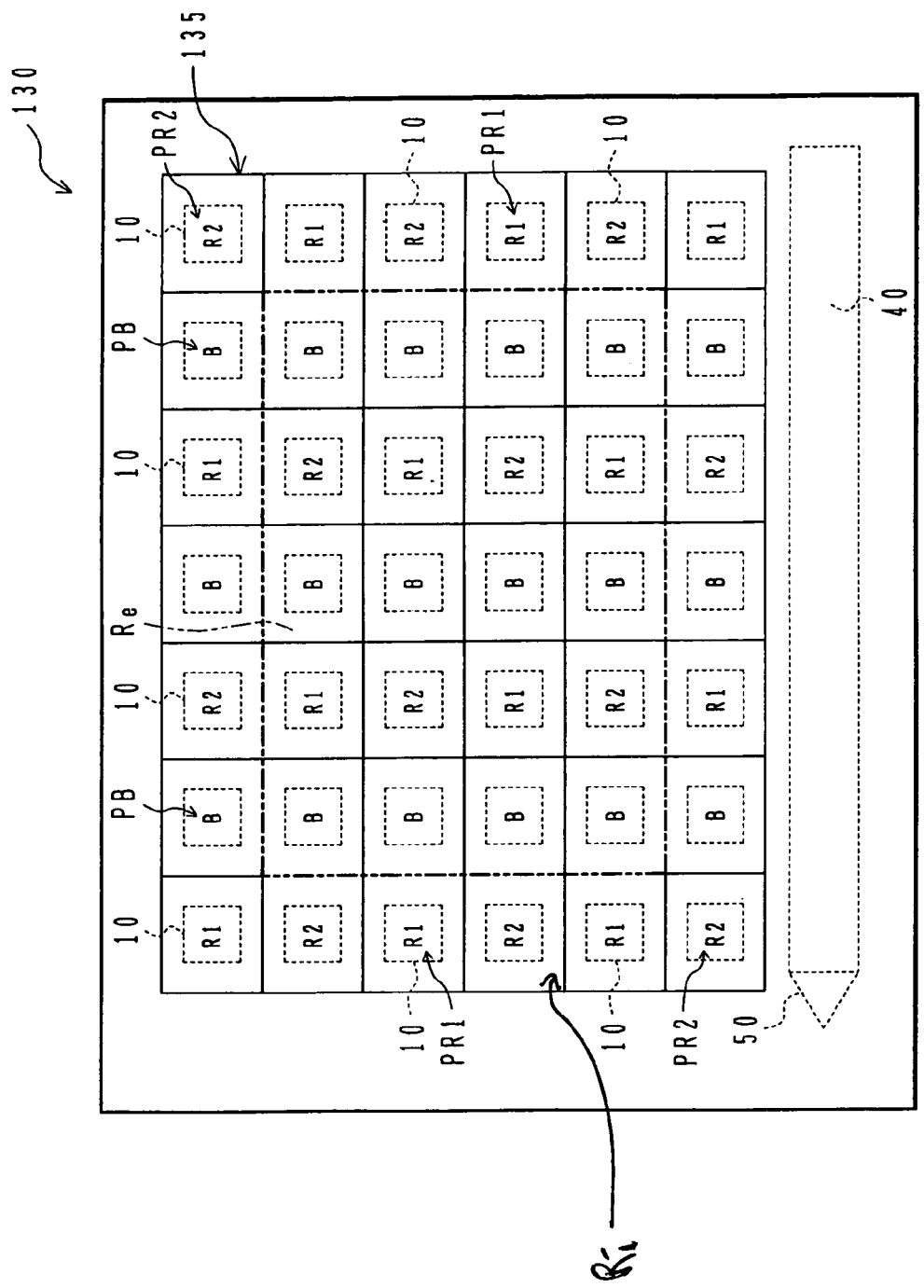
FIG. 15 is a schematic plan view showing a color filter array of a solid image pickup device according to a fourth embodiment.

FIG. 15 is a schematic plan view of a color filter array 135 of a solid state image pickup device 130 of the fourth embodiment. The solid state image pickup device 130 has a similar structure to that of the solid image pickup device 100 of the first embodiment, excepting the structure of the color filter array 135.

Two solid state image pickup devices 130 are used for a two-plate type image pickup apparatus. The color filter array 135 is made of red filters R1 and R2 and blue filters B.

A first color filter column having red filters R1 and R2 alternately disposed and a second color filter column having only blue filters B are alternately disposed. In the first color filter columns on both sides of the second color filter column, the red filters R1 and R2 are reversed.

The two-plate type image pickup apparatus using two solid image pickup devices 130 has similar effects to those of the image pickup apparatus shown in FIG. 6.

Next, a solid state image pickup device according to a fifth embodiment will be described.

Figure 16:
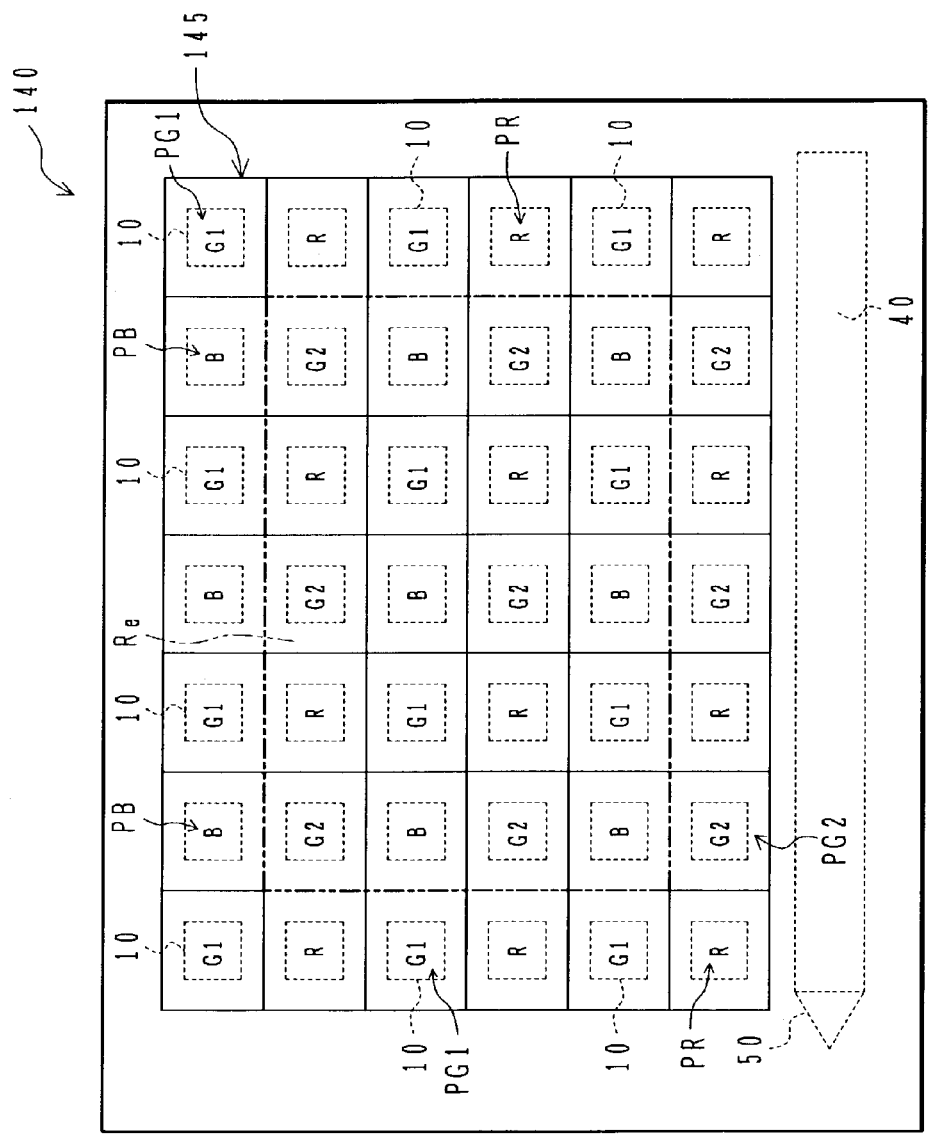
FIG. 16 is a schematic plan view showing a color filter array of a solid image pickup device according to a fifth embodiment.

FIG. 16 is a schematic plan view of a color filter array 145 of a solid state image pickup device 140 of the fifth embodiment. The solid state image pickup device 140 has a similar structure to that of the solid image pickup device 100 of the first embodiment, excepting the structure of the color filter array 145.

A single solid state image pickup device 140 is used for a single-plate type image pickup apparatus. The color filter array 145 is made of red filters R1, first and second green filters G1 and G2 and blue filters B.

The first and second green filters G1 and G2 have different spectral transmission factors in the wavelength range from 555 to 605 nm. Paying attention to the layout of only green filters, a color filter row having only the first green filters G1 and a color filter row having only the second green filters G2 are alternately disposed.

Also in the single-plate type image pickup apparatus using the solid image pickup device 140, the Ye sensitivity can be obtained from a difference between a signal for the first green pixels and a signal for the second green pixels, in the manner similar to the image pickup apparatus 200 shown in FIG. 6. Similar effects to those of the image pickup apparatus 200 can be obtained.

In calculating the Ye sensitivity of an image pickup apparatus using the solid image pickup device 140, the formulae (I) to (IV) replacing "R" with "G" and "red" with "green" are used. The Ye sensitivity is preferably calculated by using the formula (IV) among others replacing "R" with "G" and "red" with "green".

The present invention has been described in connection with the preferred embodiments of the solid state image pickup device and image pickup apparatus. The invention is not limited only to the above embodiments.

For example, the Ye sensitivity can be calculated from a difference between two signals obtained from two types of the same color pixels (eg. red or green) having different spectral sensitivity characteristics in the wavelength range from 555 to 605 nm when light becomes incident upon the two types of the same color pixels. How the two types of the same color pixels are distributed in a solid state image pickup device can be determined in accordance with the application or performance of a solid state image pickup device and an image pickup device.

In order to distinguish between the types of light sources in various photographing scenes as correctly as possible, it is preferable that two types of red or green pixels are distributed uniformly in the effective pixel area. In order to suppress the generation of a false color or an irregular color, it is preferable that the difference between the spectral sensitivity characteristics of two types of the same color pixels is made as small as possible.

In order to suppress the generation of a false color, it is preferable that only one type of the same color pixels is disposed in the effective pixel area, or even if two types of the same color pixels are disposed, one type of the same color pixels is disposed as small in number as possible. If one type of the same color pixels is disposed only in the invalid pixel area, the generation of a false color can be easily suppressed.

If one type of the same color pixels is disposed only in the invalid pixel area, two types of the same color pixels having different spectral sensitivity characteristics also in the longer wavelength region than near 640 nm can be used. If a solid image pickup device is made by using such two types of the same color pixels, an image pickup apparatus having this solid image pickup device has the spectral sensitivity of the Ye sensitivity (spectral sensitivity) calculated by the numerator of the formula (I) or (IV) added with the spectral sensitivity (hereinafter called a long red (LR) sensitivity) in the longer wavelength range than near 640 nm. The Ye sensitivity indicated by the bold solid line L33 shown in FIG. 12 is one example of the spectral sensitivity added with the LR sensitivity.

By adding the LR sensitivity to the Ye sensitivity, it becomes possible to strengthen the distinguishment performance between the sun, a tungsten incandescent lamp and a three-wavelength fluorescent lamp. In this case, it is preferable that the spectral sensitivity characteristics of two types of the same color pixels are selected so that a ratio Yep/LRp between the peak value Yep of the Ye sensitivity in the wavelength range from 555 to 605 nm and the peak value LRp of the Ye sensitivity (LR sensitivity) in the wavelength range longer than near 640 nm becomes at most 0.5 or more preferably at most 0.4. Alternatively, the spectral sensitivity characteristics of two types of the same color pixels are selected so that the ratio Yep/LRp becomes at least 2.0 or more preferably at least 2.5. If the ratio Yep/LRp is out of this range, it becomes difficult to distinguish between a standard white fluorescent lamp, the sun, and a tungsten incandescent lamp.

The Ye sensitivity is preferably calculated by using signals read from two types of adjacent pixels of the same color and pixels of other colors adjacent to the two types of the adjacent pixels.

The spectral sensitivity of a pixel can be controlled by properly selecting the spectral transmission factor of the color filter of the pixel. The spectral transmission factor of a color filter changes in accordance with, for example, the type and amount of pigment or dye contained in the color filter or the film thickness of the filter.

For example, by changing the contents of pigments of the same composition or the film thickness, red filters R1 and R2 can be made. In this case, the difference between the spectral sensitivity characteristics of red pixels PR1 and PR2 becomes small. Such a pair of red pixels PR1 and PR2 is preferable when the red pixels PR1 and PR2 are to be disposed in the valid pixel area Re.

It is more preferable to use two types of red filters than to use two types of green filters, in order to suppress a variation in Ye sensitivities to be caused by a manufacture variation in color filter arrays, regardless of whether an LR sensitivity is added to a Ye sensitivity. A red filter has a higher stability of the spectral transmission factor characteristics relative to a film thickness variation, than a green filter.

PR81, PR177, PR209, PR254 and the like can be used as red pigment of a red color filter. If yellow pigment such as PY138, PY139, PY150 and PY185 and pigment such as PG7 and PV23 are added to red pigment, a red filter can be made which has the spectral transmission factor characteristics different from a red filter made of only red pigment.

A color filter colored with dye may also be made.

Two types of pixels having different spectral sensitivity characteristics may be formed by changing the light transmission characteristics of layers other than the color filter layer disposed above photoelectric conversion elements, even if the spectral transmission factor characteristics of the color filters are the same. For example, such two types of pixels having different spectral sensitivity characteristics can be formed by thickening or thinning a silicon nitride film above specific photoelectric conversion elements, the film being often used in a solid state image pickup device.

If a micro lens is disposed above each photoelectric conversion element, the micro lens may be provided with a color filter function.

Two types of pixels having different spectral sensitivity characteristics may be formed by disposing in a predetermined pattern two types of micro lenses having different spectral transmission factor characteristics in the wavelength range from 555 to 605 nm.

The structure of a solid state image pickup device may be changed as desired in accordance with the application, performance and the like of the device.

If a solid state image pickup device has a number of photoelectric conversion elements disposed in a tetragonal matrix layout, the vertical charge transfer unit may have, for example, two to four vertical transfer electrodes per one photoelectric conversion row. If a solid state image pickup device has a number of photoelectric conversion elements disposed in a pixel shift layout, the vertical charge transfer unit may have, for example, one to four vertical transfer electrodes per one photoelectric conversion row.

In both the tetragonal matrix layout and pixel shift layout of a number of photoelectric conversion elements, the number of phases of a drive signal may be selected as desired to drive the vertical and horizontal charge transfer units. The horizontal charge transfer unit may be driven by two or more horizontal transfer electrodes per one vertical charger transfer unit.

A solid state image pickup device may be a MOS solid image pickup device.

Figure 17A:
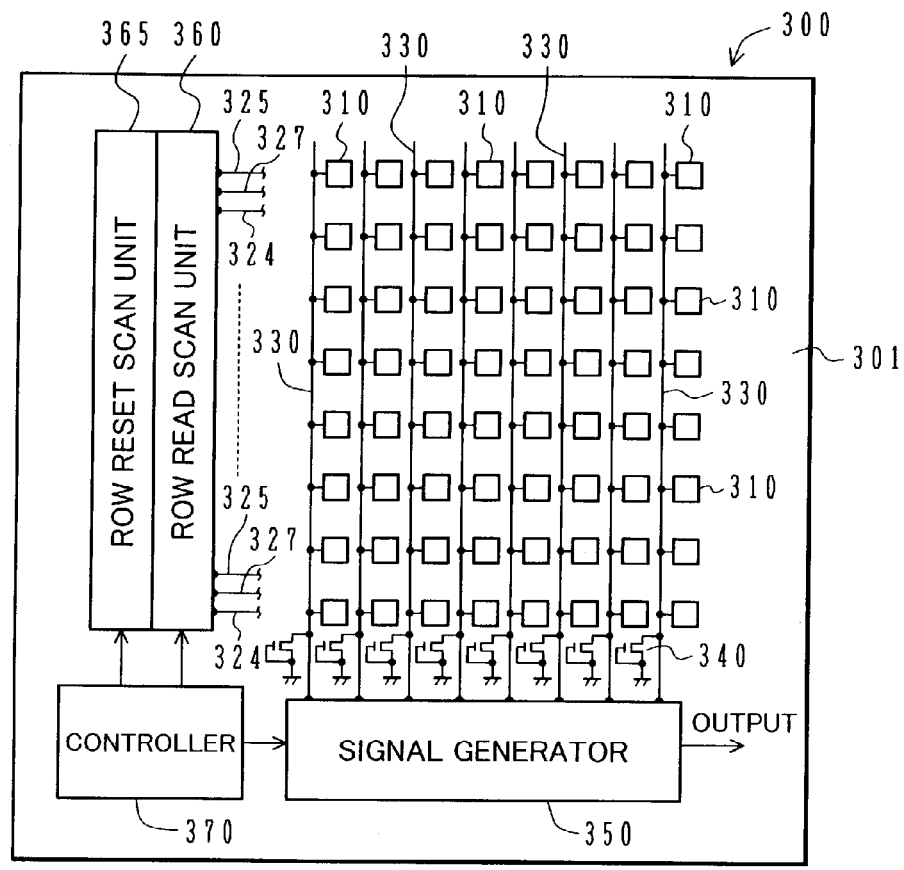
FIG. 17A is a schematic diagram showing the layout of photoelectric conversion elements and an output signal generator of a MOS type solid state image pickup device using an area image sensor.

FIG. 17A is a schematic diagram showing the layout of photoelectric conversion elements and an output signal generator of a MOS solid image pickup device to be used as an area image sensor.

In a solid state image pickup device 300, on the surface of a semiconductor substrate 301, a number of pixels 310 are disposed along rows and columns in a tetragonal matrix shape. In each pixel, one switching circuit is connected to one photoelectric conversion element.

Along each pixel column, an output signal line 330 is disposed. A load transistor 340 is connected to each output signal line 330 which is connected to a signal generator 350.

As light becomes incident upon a photoelectric conversion element, charges are accumulated in this element. By properly controlling the switching circuit, an electric signal corresponding to the amount of charges accumulated in the photoelectric conversion element can be output to the corresponding output signal line 330. This electric signal is detected and converted into a predetermined output signal (pixel signal) by the signal generator 350 and forms the output of the solid state image pickup device 300.

A row read scan unit 360 and a row reset scan unit 365 are disposed on the semiconductor substrate 301 in order to control the operation of the switching circuit connected to each photoelectric conversion element in the unit of a pixel row.

The row read scan unit 360 controls the operation of each switching circuit to establish an electric connection between each photoelectric conversion element and corresponding output signal line 330. The row reset scan unit 365 controls the operation of each switching circuit to control an operation of draining charges accumulated in each photoelectric conversion element.

In order to transfer signals necessary for such control operations, a row select signal line 324 and a reset signal line 327 are disposed for each pixel row. A power supply voltage line 325 is disposed for each pixel row or column. Each switching circuit can be electrically connected to these signal lines and a voltage line.

A controller 370 is disposed on the semiconductor substrate 301 to control the operations of the signal generator 350, row read scan unit 360 and row reset scan unit 365.

Figure 17B:
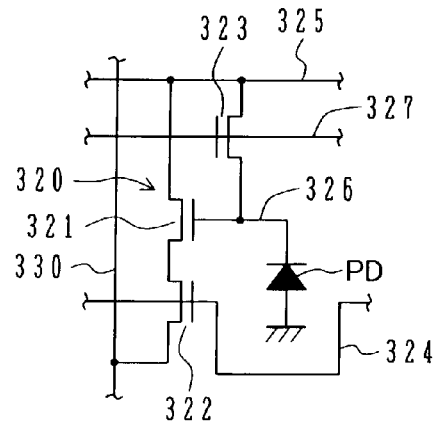
FIG. 17B shows an example of a switching circuit connected to the photoelectric conversion elements.

FIG. 17B shows an example of the switching circuit. A switching circuit 320 includes an output transistor 321, a row select transistor 322 and a reset transistor 323. These transistors are MOS transistors.

The output transistor 321 and row select transistor 322 are connected serially, a photoelectric conversion element PD is connected to the gate of the output transistor 321, and a row select signal line 324 is connected to the gate of the row select transistor 322. The other terminal of the output transistor 321 is connected to a power supply voltage line 325 and the other terminal of the row select transistor 322 is connected to an output signal line 330.

The reset transistor 323 is connected to a line 326 interconnecting the output transistor 321 and PD and also to the power supply voltage line 325, and the gate thereof is connected to a reset signal line 327.

An output signal generator is constituted of the switching circuits 320, output signal lines 330, load transistors 340, signal generator 350, row read scan unit 360 and row reset scan unit 365.

As a read signal is applied from the row read scan unit 360 to the row select signal line 324, the row select transistor 322 connected to the row select signal line 324 turns on so that the output transistor 321 and corresponding output signal line 330 are electrically connected.

Voltage at the gate of the output transistor 321 changes depending on charges accumulated in PD connected to the output transistor 321. Drain current flowing through the output transistor 321 therefore changes depending on the charges accumulated in PD. As a result, when the row select transistor 322 turns on, an electrical signal corresponding to the charges accumulated in PD appears on the output signal line 330.

When a reset signal is applied from the row reset scan unit 365 to the reset signal line 327, the reset transistor 323 connected to the reset signal line 327 turns on. PD is connected to the power supply voltage line 325 so that the charges accumulated in PD are drained to the power supply voltage line 325.

Similar to a CCD solid state image pickup device, also in the MOS solid image pickup device 300, a light shielding film, an interlayer insulating film, a passivation film and a planarizing film are sequentially deposited on the semiconductor substrate 301, and on this structure a color filter array is disposed. If necessary, a micro lens array is disposed above the color filter array.

The structure of the video signal generator of an image pickup apparatus having either a CCD or MOS solid image pickup device is not limited to that shown in FIG. 8.

For example, although white balance is obtained by using the first to fourth gain adjustors 242 to 248 of the image pickup apparatus 200 shown in FIG. 8, the level of the green signal SG may not be changed. In this specification, the "gain adjustor" for the green signal SG either adjusts or does not adjust the level. For example, if exposure is not necessary to be corrected by the AE function, white balance is obtained without changing the level of the green signal SG.

Although the two gain adjustors 242 and 244 shown in FIG. 8 adjust the levels of the first and second red signals SR1 and SR2, one gain adjustor may adjust the levels of the first and second red signals SR1 and SR2 if the red filters R1 and R2 are disposed in the valid pixel area.

The linear matrix calculator LM may be omitted, or it may be provided not in the luminance—color difference signal generator 250, but between the color separator 235 and gain adjustor 240.

If the linear matrix calculator LM is provided between the color separator 235 and gain adjuster 240, output signals from the color separator 235 are input to the linear matrix calculator LM whose output signals are input to the exposure amount detector 237, gain adjustor 240 and auto white balance circuit 260. In the image pickup apparatus constructed in this manner, the output signals from the linear matrix calculator LM correspond to the red, green and blue signals of the image pickup apparatus shown in FIG. 8.

Alternatively, the image pickup apparatus may be structured in such a manner that output signals from the color separator 235 are input to the exposure amount detector 237, auto white balance circuit 260 and linear matrix calculator LM and that output signals from the linear matrix calculator LM are input to the gain adjustor 240. In the image pickup apparatus constructed in this manner, the output signals from the color separator 235 are red, green and blue signals similar to the image pickup apparatus 200 shown in FIG. 8.

The color separator 235 may be provided not in the video signal generator but in the digital signal generator 220. In this case, output signals of the color separator 235 are arranged to be input to the AGC circuit 224 (refer to FIG. 6).

It is apparent that various modifications, improvements, combinations, and the like can be made by those skilled in the art.

I claim:

1. A solid state image pickup device for generating an image, comprising:
   a semiconductor substrate;
   a plurality of pixels disposed on a surface of said semiconductor substrate along rows and columns in a matrix shape, said plurality of pixels being disposed in an effective pixel area corresponding to a reproduced image area and an invalid pixel area defined in the surface of said semiconductor area, the invalid pixel area being defined around the effective pixel area, wherein each of said plurality of pixels comprises:
      a photoelectric conversion element for accumulating electric charges; and
      a color filter disposed above said photoelectric conversion element for transmitting at least one of red, green and blue light fluxes of incidence light to a corresponding one of said plurality of pixels, wherein a first of said plurality of pixels and a second of said plurality of pixels are both either red or green, and said first of said plurality of pixels and said second of said plurality of pixels have different spectral sensitivities; and
   an output signal generator for generating an output signal in accordance with charges accumulated in said plurality of pixels, wherein each of said first of said plurality of pixels and said second of said plurality of pixels are included in said image, and
   wherein only said first of said plurality of pixels is disposed in the effective pixel area and said second of said plurality of pixels is disposed in the invalid pixel area.

2. A solid state image pickup device for generating an image, comprising:
- a semiconductor substrate;
- a plurality of pixels disposed in a pixel shift layout on a surface of said semiconductor substrate along rows and columns in a matrix shape, wherein each of said plurality of pixels comprises:
  - a photoelectric conversion element for accumulating electric charges; and
  - a color filter disposed above said photoelectric conversion element for transmitting at least one of red, green and blue light fluxes of incidence light to a corresponding one of said plurality of pixels, wherein a first of said plurality of pixels and a second of said plurality of pixels are both either red or green and said first of said plurality of pixels and said second of said plurality of pixels have different spectral sensitivities; and
- an output signal generator for generating an output signal in accordance with charges accumulated in said plurality of pixels, wherein each of said first of said plurality of pixels and said second of said plurality of pixels are included in said image,
- wherein said plurality of pixels include rows having only green pixels and rows including red and blue pixels and
- wherein two different types of red pixels are alternately disposed in row and column directions.

3. An image pickup apparatus for generating an image, comprising:
- at least one solid state image pickup device configured to convert an optical image of an object into an electric signal and to output the electric signal, said at least one solid state image pickup device having a plurality of pixels, wherein a first of said plurality of pixels is a particular color selected from a plurality of colors, and a second of said plurality of pixels is said particular color, wherein said first of said plurality of pixels and said second of said plurality of pixels have different spectral sensitivities;
- an image pickup optical system for focusing an object image on said at least one solid state image pickup device;
- a digital signal generator for converting an output signal from said at least one solid state image pickup device into a digital signal and outputting the digital signal;
- a video signal generator for generating red, green and blue signals from the digital signal output from said digital signal generator and generating a pixel signal for image reproduction by using the red, green and blue signals; and
- an auto white balance circuit for receiving the red, green and blue signals, detecting a color temperature of a light source, judging a type of the light source based at least on a difference between intensities of light incident upon each of said first of said plurality of pixels and said second of said plurality of pixels, and adjusting levels of the red, green and blue signals in said video signal generator in accordance with a detection result of the color temperature and a judgment result of the type of the light source, wherein each of said first of said plurality of pixels and said second of said plurality of pixels are included in said image,
- wherein the type of the light source is judged by using one of formulae (I) to (IV):

$$(S_{R1}-k_4 S_{R2})/(k_1 S_{R1}+k_2 S_{R2}+k_3 S_G) \quad \text{(I)}$$

$$(S_{R1}-k_{11} S_{R2})/(k_{10} S_G) \quad \text{(II)}$$

$$(S_{R1}-k_{22} S_{R2})/(k_{20} S_{R1}+k_{21} S_{R2}) \quad \text{(III)}$$

$$(S_{R1}-k_{34} S_{R2}-k_{35} S_G-k_{36} S_B)/(k_{31} S_{R1}+k_{32} S_{R2}+k_{33} S_G) \quad \text{(IV)}$$

where $S_{R1}$: an average output of signals generated from charges read from red pixels PR1; $S_{R2}$: an average output of signals generated from charges read from red pixels PR2; $S_G$: an average output of signals generated from charges read from green pixels PG; $S_B$: an average output of signals generated from charges read from blue pixels PB; $k_1$, $k_2$, $k_3$, $k_4$, $k_{10}$, $k_{11}$, $k_{20}$, $k_{21}$, $k_{22}$, $k_{31}$, $k_{32}$, $k_{33}$ $k_{34}$, $k_{35}$, $K_{36}$: coefficients.

* * * * *